(12) United States Patent
Natesh et al.

(10) Patent No.: US 10,875,879 B2
(45) Date of Patent: Dec. 29, 2020

(54) COMPOSITIONS, SYNTHESIS, AND USES OF HYDROLYZABLE SILANE MODIFIED CASHEW NUT SHELL LIQUID DERIVATIVES

(71) Applicant: Cardolite Corporation, Monmouth Junction, NJ (US)

(72) Inventors: Anbazhagan Natesh, North Wales, PA (US); Timothy Stonis, Newtown, PA (US); Chetan Tambe, Solapur (IN); Pietro Campaner, Trieste (IT)

(73) Assignee: CARDOLITE CORPORATION, Monmouth Junction, NJ (US)

( * ) Notice: Subject to any disclaimer, the term of this patent is extended or adjusted under 35 U.S.C. 154(b) by 0 days.

(21) Appl. No.: 16/128,971

(22) Filed: Sep. 12, 2018

(65) Prior Publication Data

US 2019/0077815 A1 Mar. 14, 2019

Related U.S. Application Data

(60) Provisional application No. 62/557,333, filed on Sep. 12, 2017.

(51) Int. Cl.
| | | |
|---|---|---|
| *C07F 7/18* | (2006.01) | |
| *C08K 5/5419* | (2006.01) | |
| *C08G 18/28* | (2006.01) | |
| *C08G 18/38* | (2006.01) | |
| *C08G 59/14* | (2006.01) | |
| *C08G 59/02* | (2006.01) | |
| *C08L 21/00* | (2006.01) | |
| *C08L 75/04* | (2006.01) | |
| *C08L 63/00* | (2006.01) | |

(52) U.S. Cl.
CPC ........... *C07F 7/1804* (2013.01); *C08G 18/289* (2013.01); *C08G 18/3893* (2013.01); *C08G 59/027* (2013.01); *C08G 59/1477* (2013.01); *C08K 5/5419* (2013.01); *C08L 21/00* (2013.01); *C08L 63/00* (2013.01); *C08L 75/04* (2013.01)

(58) Field of Classification Search
None
See application file for complete search history.

(56) References Cited

U.S. PATENT DOCUMENTS 9,187,603 B2    11/2015   Chen et al.

FOREIGN PATENT DOCUMENTS

| WO | 2006003668 A1 | 1/2006 |
| WO | 2007077567 A1 | 7/2007 |
| WO | 2008131918 A1 | 11/2008 |

OTHER PUBLICATIONS

Voirin et al. Polym. Chem. 2014, 5, 3142-3162.*
Lubi et al., "Cashew nut shell liquid (CNSL)—a versatile monomer for polymer synthesis" Designed Monomers and Polymers, (2000) 3:2, 123-153.
Madhusudhan et al., "Polyfunctional compounds from cardanol", Progress in Organic Coat&zgs, 20 (1992) 63-71.
Perdriau et al., "Selective Conversion of Polyenes to Monoenes by RuCl3—Catalyzed Transfer Hydrogenation: The Case of Cashew Nutshell Liquid", ChemSusChem (2012) 5, 2427-2434.

* cited by examiner

*Primary Examiner* — Clinton A Brooks
(74) *Attorney, Agent, or Firm* — Troutman Pepper Hamilton Sanders LLP

(57) ABSTRACT

The present disclosure provides cashew nut shell liquid derivatives based organosilicon products and methods and uses of preparing the same.

26 Claims, No Drawings

COMPOSITIONS, SYNTHESIS, AND USES OF HYDROLYZABLE SILANE MODIFIED CASHEW NUT SHELL LIQUID DERIVATIVES

CROSS-REFERENCE TO RELATED APPLICATIONS

This application claims priority under 35 U.S.C. § 119 to U.S. Provisional Application No. 62/557,333, filed Sep. 12, 2017, which is hereby incorporated by reference in its entirety.

FIELD

The present embodiments relate to, in some embodiments, to the synthesis of novel cardanol-based derivatives through the introduction of silane functional groups. In some embodiments, the derivatives are used in 1K and 2K formulations for coatings, adhesives, sealants and elastomers applications.

BACKGROUND

Cashew nut shell liquid (CNSL) is one of the most widely used bio-based resource to provide useful chemicals for coatings, adhesives, sealants and elastomers (collectively "CASE") applications. Cardanol is a chemical derived by decarboxylation of anacardic acid which is the primary component of CNSL. Cardanol is a meta substituted phenol ring with mono-, di-, tri- unsaturated and saturated long 15 carbon chains, as shown, for example:

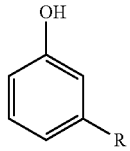

where R:

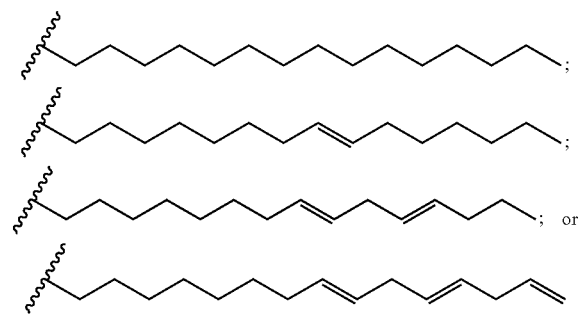

This illustrates the general structure of cardanol containing side chain with varying number of unsaturation sites The structure of cardanol is unique as it has an aromatic ring at one end, which provides excellent rigidity, and the long chain at the meta position, which provides a good moisture barrier. Cardanol has been explored extensively by derivatizing through the phenolic ring: A) reactive modification through phenolic OH, for e.g., epoxies etc., B) ortho and para substitution on the ring to provide different type of reactive functionalities like amines, epoxies, polyols, amides etc., (Lubi, M. C.; Thachil, E. T., *Designed Monomers and Polymers* (2000), 3, 2, 123-153; Voirin, C.; Caillol, S.; Sadavarte, N. V.; Tawade, B. V.; Boutevin, B.; Wadgaonkar, P. P. *Polym. Chem.* (2014), 5, 3142-3162; A. Parambath, *Cashew Nut Shell Liquid: a goldfield for functional materials*, Springer, 2017), each of which is incorporated by reference in its entirety.

The unsaturation sites present on the cardanol side chain have only a limited numbers of examples in the literature and mainly focus on the introduction of hydroxyl and epoxy functionalities, acrylic, carboxylic or phosphorous containing groups or double bonds hydrogenation (Chen, Z.; Liu, R. US0345383; Ittara, S. K.; Sarangapani, K. WO2006003668; Prasad, V. S. N.; Pillai, C. K. S. WO2007077567; Madhusudhan, V.; Murthy, B. G. K. Prog. Org. Coatings, 20 (1992), 63-71; Perdriau, S.; Harder, S.; Heeres, H. J.; de Vries, J. G. ChemSusChem, 5 (2012), 2427-2434), each of which is incorporated by reference in its entirety.

Accordingly, there is still a need to provide increased functionality to cardanol derivatives. The present disclosure provides for novel compounds and methods of making the same that can be used in CASE applications and other applications. The present application fulfills these needs as well as others.

SUMMARY

In some embodiments, a compound of Formula I is provided:

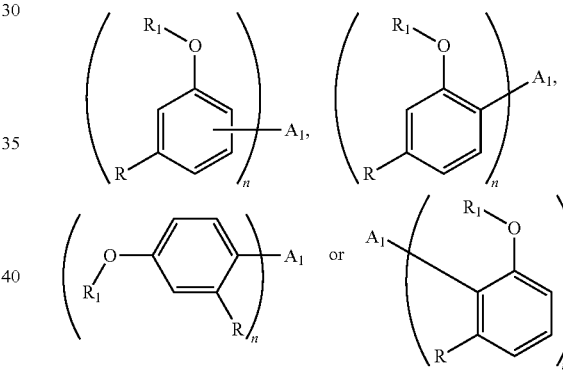

wherein:

$A_1$ is methylene; linear, branched and/or substituted alkyl (e.g. $C_1$-$C_{20}$, $C_2$-$C_{20}$, $C_2$-$C_{10}$, $C_2$-$C_{10}$, $C_1$-$C_8$, $C_2$-$C_8$, $C_1$-$C_6$, $C_2$-$C_6$, $C_1$-$C_4$, $C_2$-$C_4$, or $C_1$-$C_3$ alkyl); linear, branched and/or substituted aryl; linear, branched and/or substituted phenyl; linear, branched and/or substituted alkenyl (e.g. $C_1$-$C_{20}$, $C_2$-$C_{20}$, $C_2$-$C_{10}$, $C_2$-$C_{10}$, $C_1$-$C_8$, $C_2$-$C_8$, $C_1$-$C_6$, $C_2$-$C_6$, $C_1$-$C_4$, $C_2$-$C_4$, or $C_1$-$C_3$ alkenyl); —$CH_2$—(NH-alkyl-$NH_2$), where alkyl ($C_1$-$C_{20}$, $C_2$-$C_{20}$, $C_2$-$C_{10}$, $C_2$-$C_{10}$, $C_1$-$C_8$, $C_2$-$C_8$, $C_1$-$C_6$, $C_2$-$C_6$, $C_1$-$C_4$, $C_2$-$C_4$, or $C_1$-$C_3$ alkyl) can be linear, branched and/or substituted; —$CH_2$—(NH-aryl-$NH_2$), where aryl can be linear, branched and/or substituted; —$CH_2$—(NH-phenyl-$NH_2$), where phenyl can be linear, branched and/or substituted; —$CH_2$—N—($CH_2CH$—$R_5$—O)$_2$—($CH_2CH$—$R_5$—O)$_{0.10}$—H, where $R_5$ can be H or $CH_3$; halogen; amino; azido; or nitro;

R is

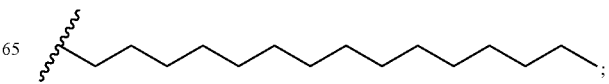

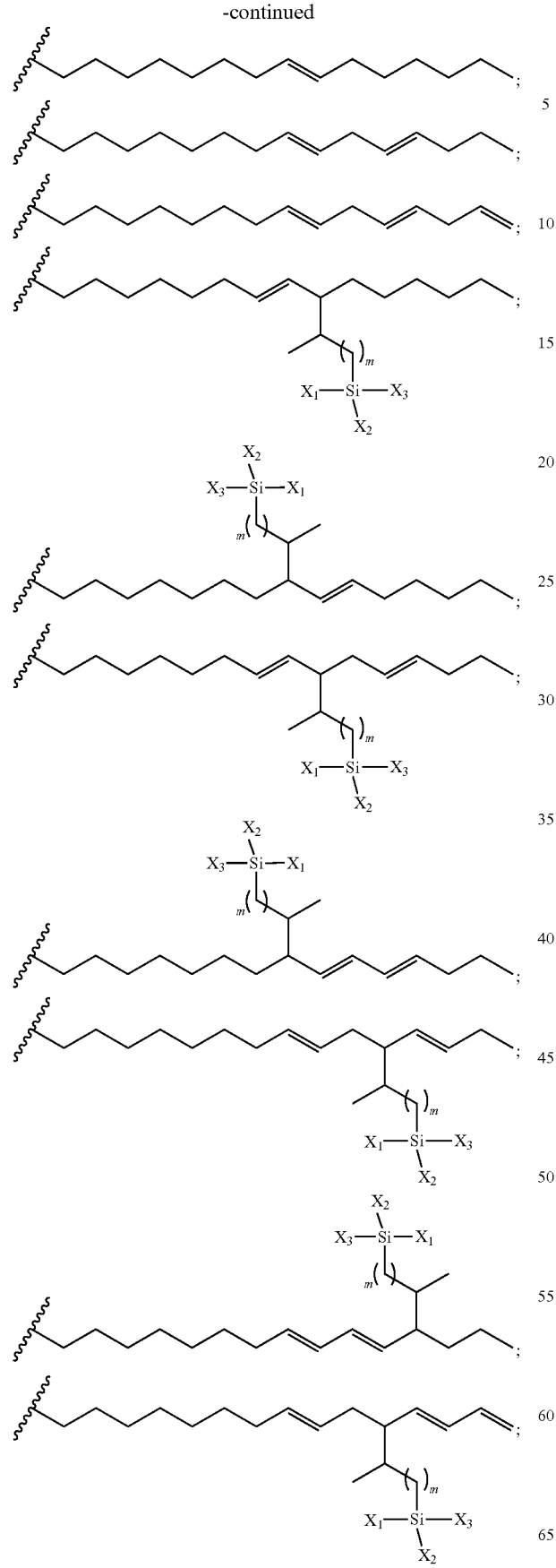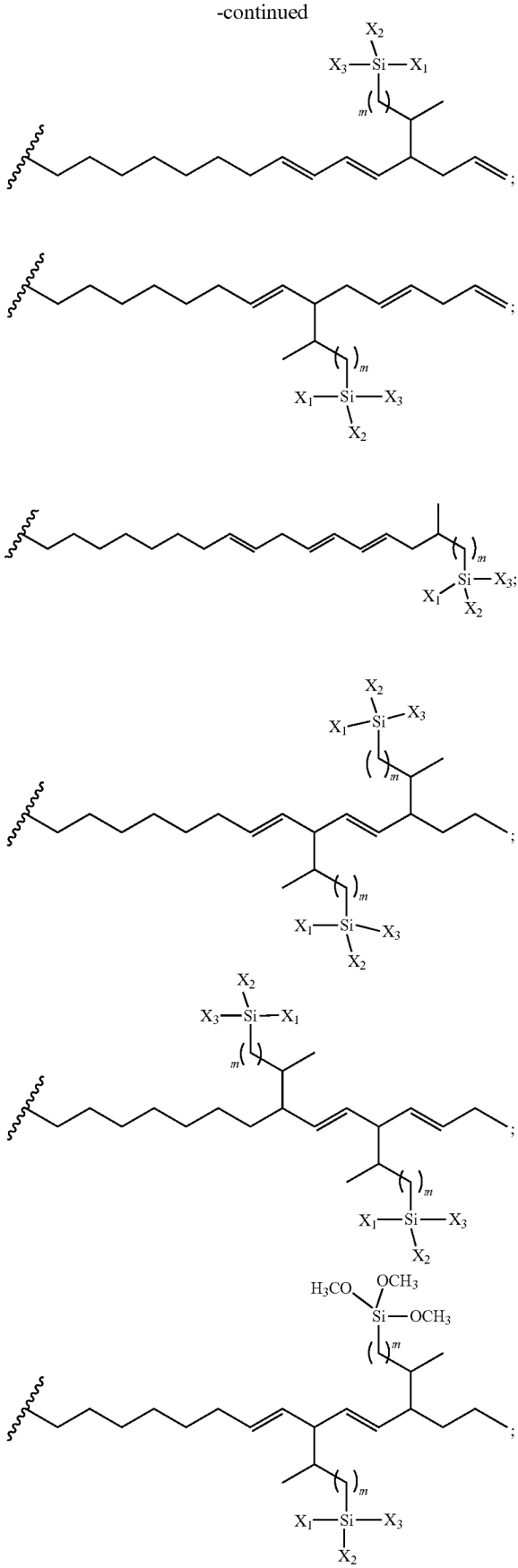

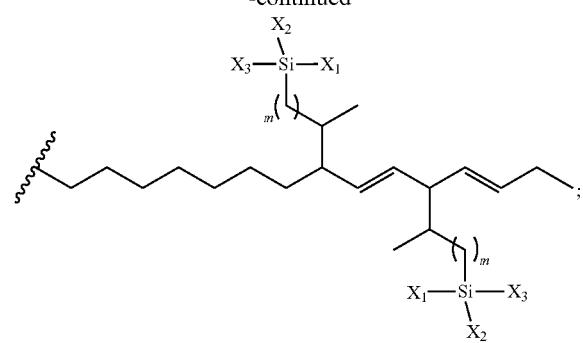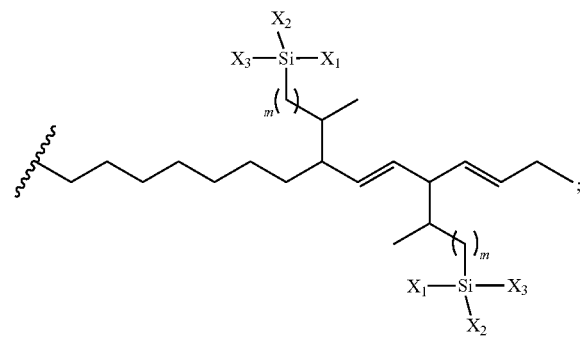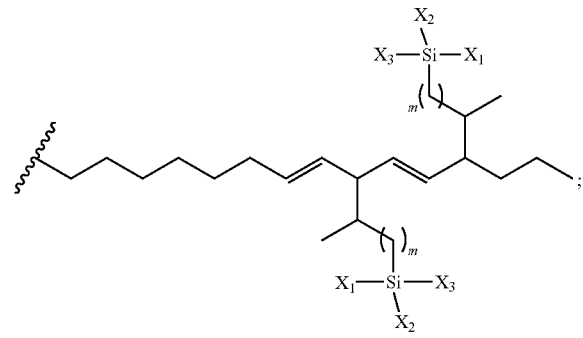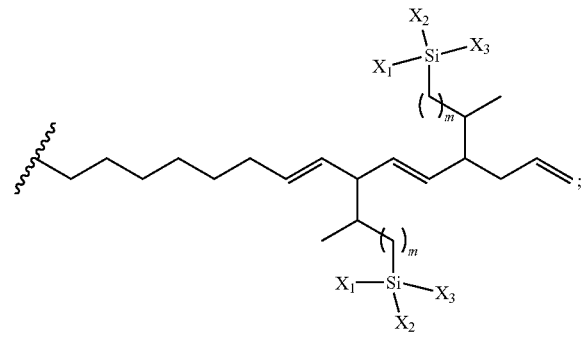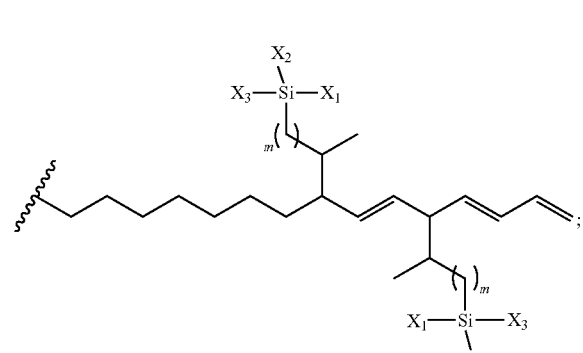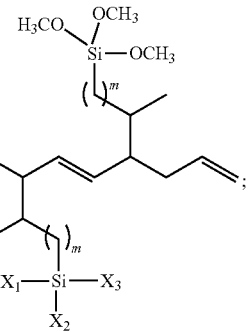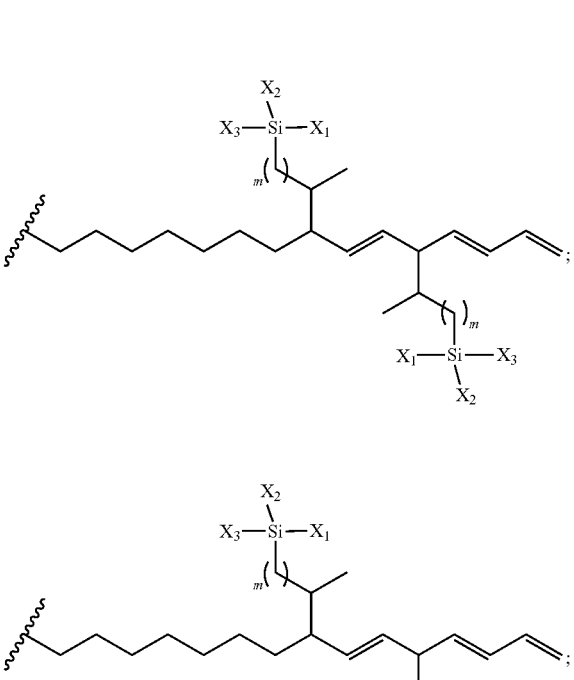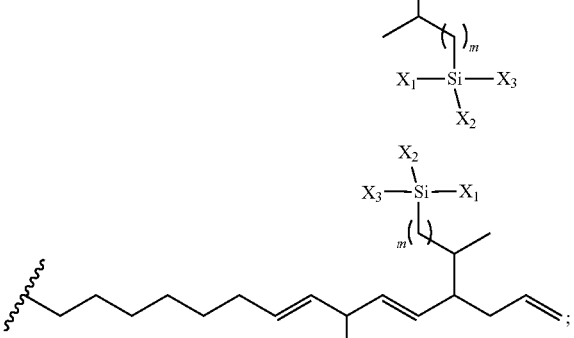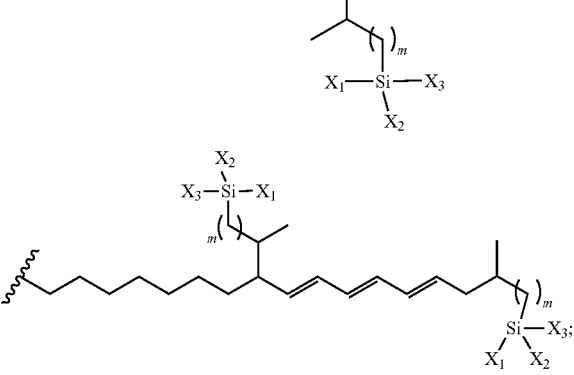

-continued

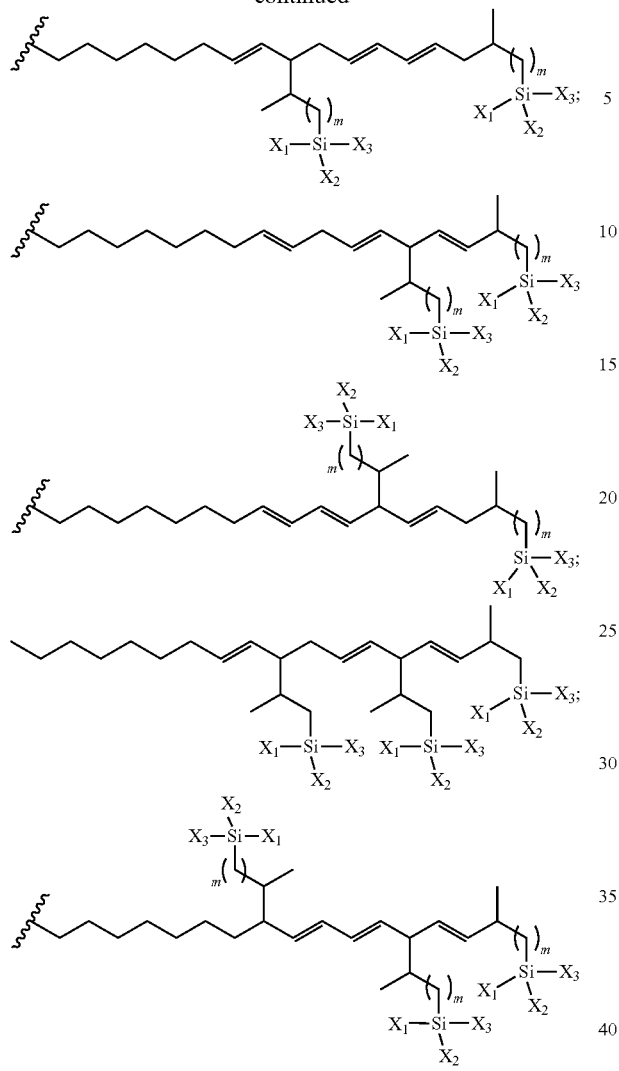

and

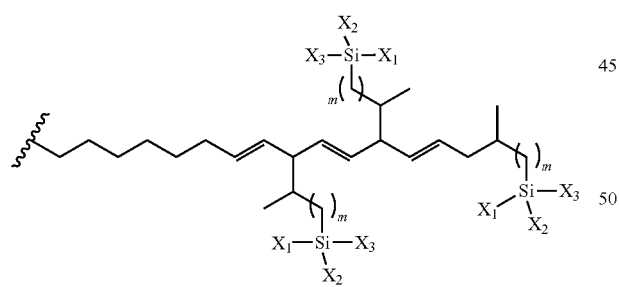

$R_1$ is hydrogen, an epoxy, an alkyl, an ether or an ester group;

n is 1-20;

m is independently 0-20;

$X_1$ is independently a hydrolyzable group selected from chloro, methoxy, propoxy, methylalkoxy, acetoxy, silazanes, oximes, and the like;

$X_2$ is independently a saturated or unsaturated hydrocarbon chain of 1-20 carbon atoms, or is hydrolyzable group selected from chloro, methoxy, propoxy, methylalkoxy, acetoxy, silazanes, oximes, and the like; and $X_3$ is independently a saturated or unsaturated hydrocarbon chain of 1-20 carbon atoms, or is hydrolyzable group selected from chloro, methoxy, propoxy, methylalkoxy, acetoxy, silazanes, oximes, and the like.

In some embodiments, a compound of Formula II is provided:

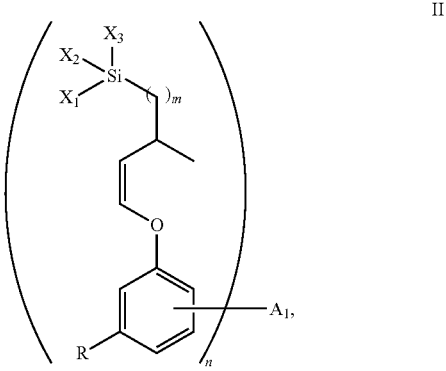

II wherein:

$A_1$ is methylene; linear, branched and/or substituted alkyl (e.g. $C_1$-$C_{20}$, $C_2$-$C_{20}$, $C_2$-$C_{10}$, $C_2$-$C_{10}$, $C_1$—C, $C_2$-$C_8$, $C_1$-$C_6$, $C_2$-$C_6$, $C_1$-$C_4$, $C_2$-$C_4$, or $C_1$-$C_3$ alkyl); linear, branched and/or substituted aryl; linear, branched and/or substituted phenyl; linear, branched and/or substituted alkenyl (e.g. $C_1$-$C_{20}$, $C_2$-$C_{20}$, $C_2$-$C_{10}$, $C_2$-$C_{10}$, $C_1$-$C_8$, $C_2$-$C_8$, $C_1$-$C_6$, $C_2$-$C_6$, $C_1$-$C_4$, $C_2$-$C_4$, or $C_1$-$C_3$ alkenyl); —$CH_2$—(NH-alkyl-$NH_2$), where alkyl ($C_1$-$C_{20}$, $C_2$-$C_{20}$, $C_2$-$C_{10}$, $C_2$-$C_{10}$, $C_1$-$C_8$, $C_2$-$C_8$, $C_1$-$C_6$, $C_2$-$C_6$, $C_1$-$C_4$, $C_2$-$C_4$, or $C_1$-$C_3$ alkyl) can be linear, branched and/or substituted; —$CH_2$—(NH-aryl-$NH_2$), where aryl can be linear, branched and/or substituted; —$CH_2$—(NH-phenyl-$NH_2$), where phenyl can be linear, branched and/or substituted; —$CH_2$—N—($CH_2CH$—$R_5$—O)$_2$—($CH_2CH$—$R_5$—O)$_{0.10}$—H, where $R_5$ can be H or $CH_3$; halogen; amino; azido; or nitro;

R is

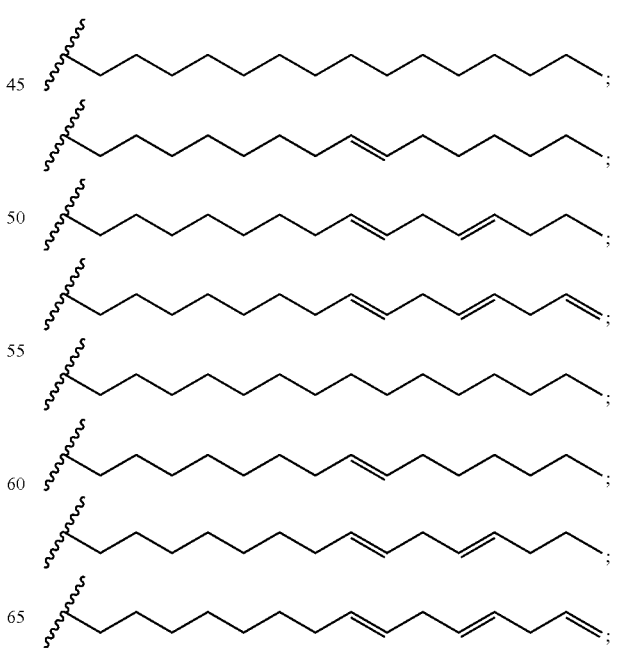

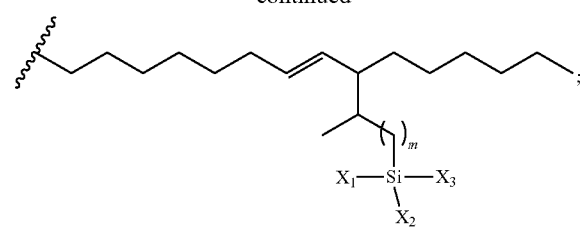
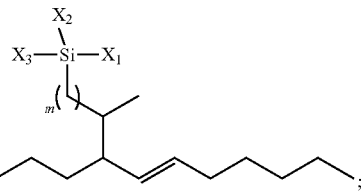
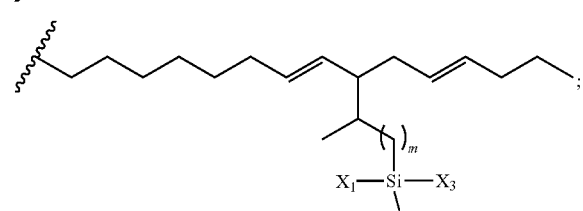
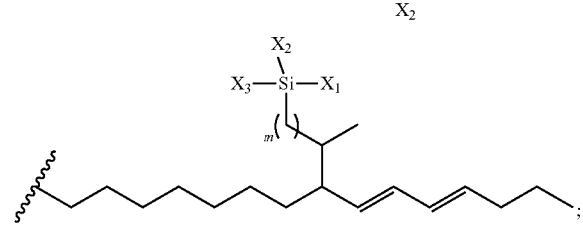
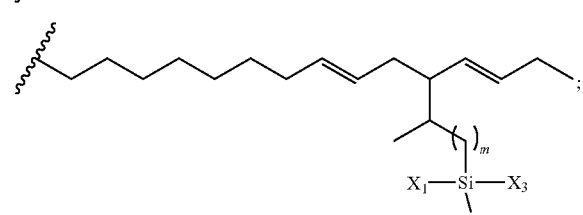
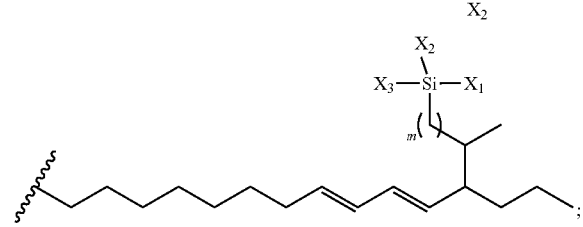
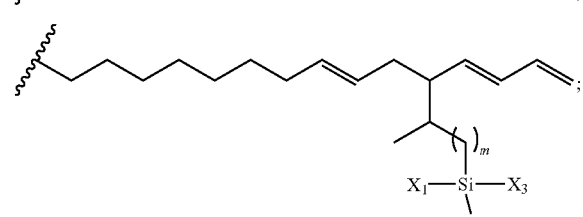
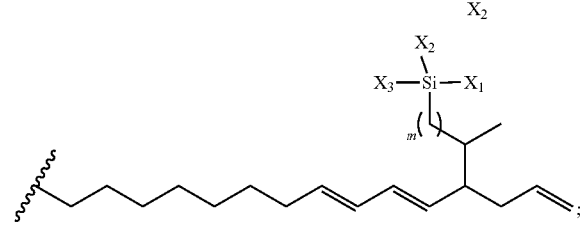
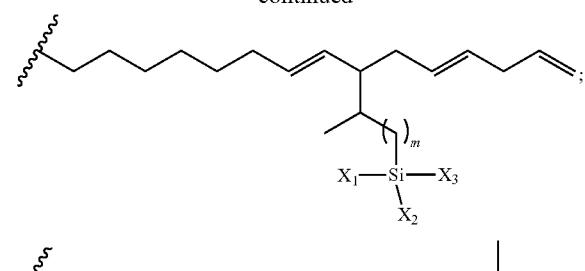
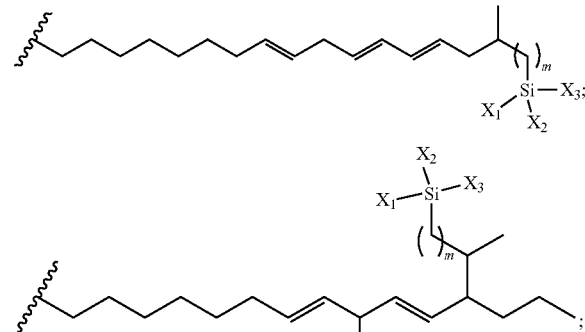
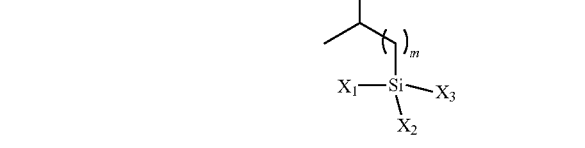
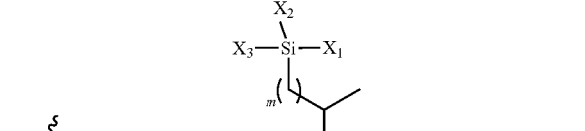
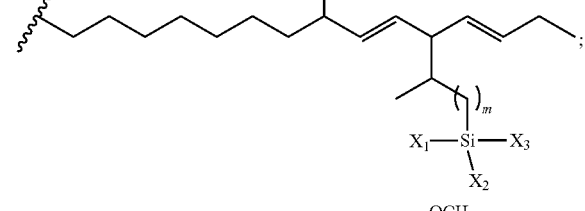
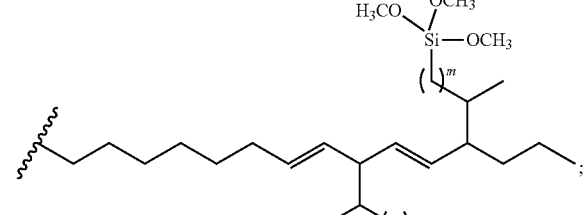
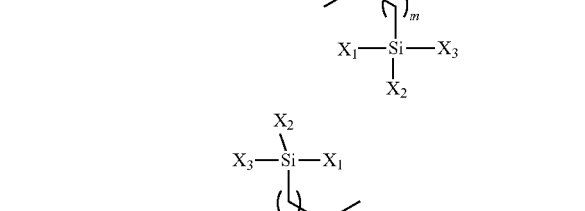
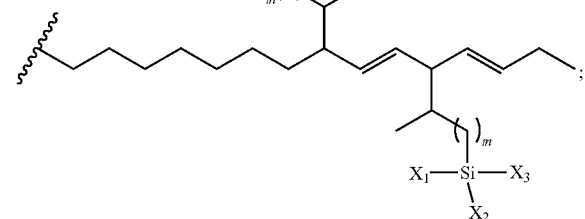

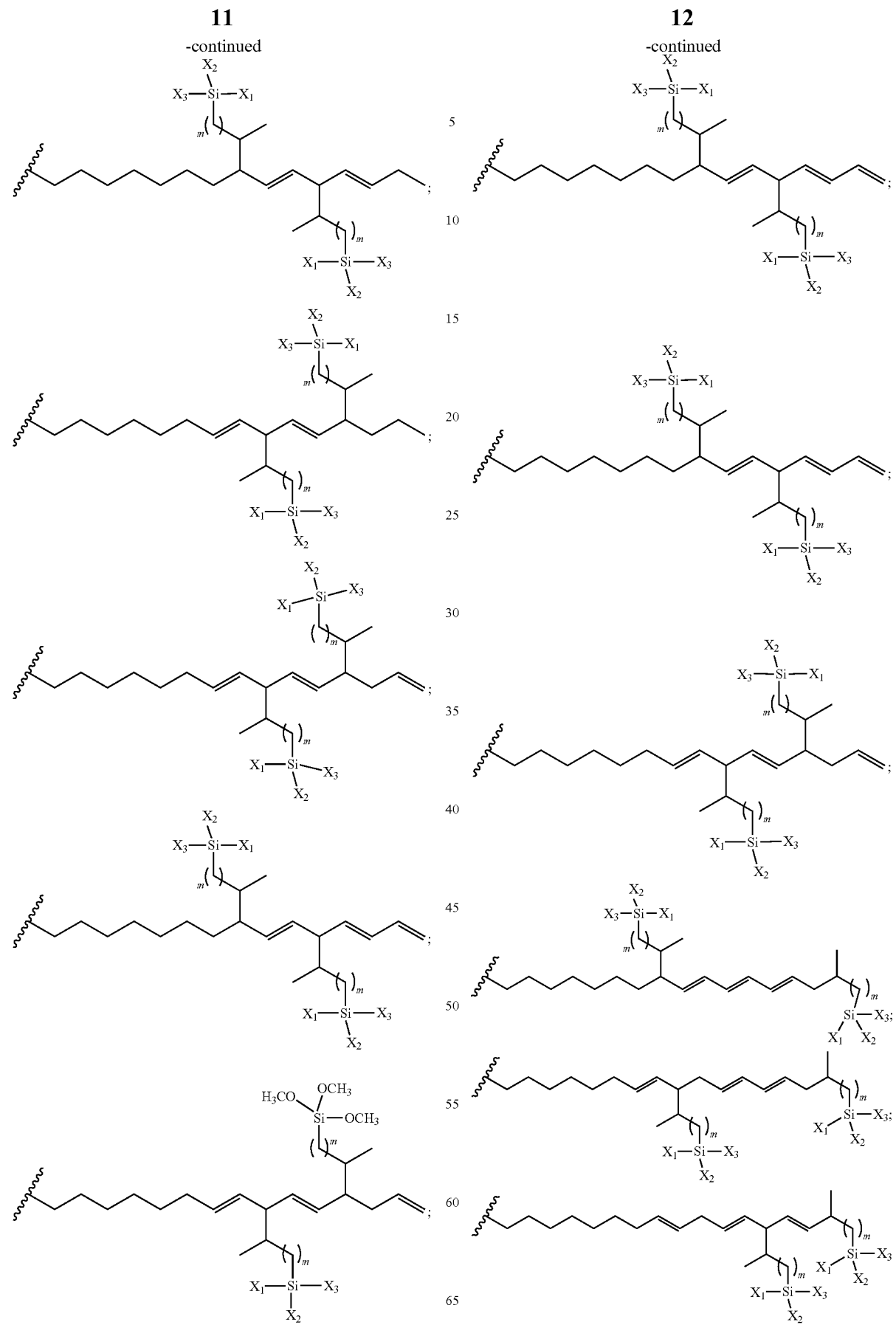

-continued

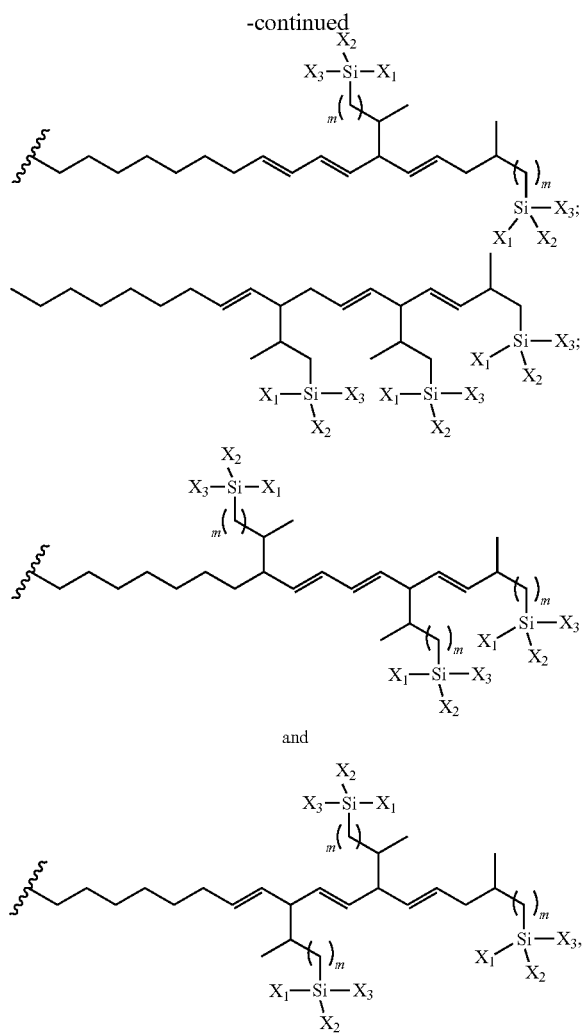

and

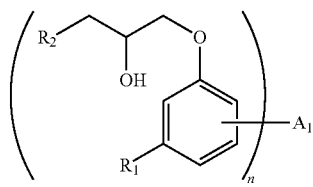

wherein:
n is 1-20;
m is independently 0-20;
$X_1$ is independently a hydrolyzable group selected from chloro, methoxy, propoxy, methylalkoxy, acetoxy, silazanes, oximes, and the like;
$X_2$ is independently a saturated or unsaturated hydrocarbon chain of 1-20 carbon atoms, or is hydrolyzable group selected from chloro, methoxy, propoxy, methylalkoxy, acetoxy, silazanes, oximes, and the like; and
$X_3$ is independently a saturated or unsaturated hydrocarbon chain of 1-20 carbon atoms, or is hydrolyzable group selected from chloro, methoxy, propoxy, methylalkoxy, acetoxy, silazanes, oximes, and the like.

In some embodiments, a compound comprising one or more units of Formula III is provided:

III

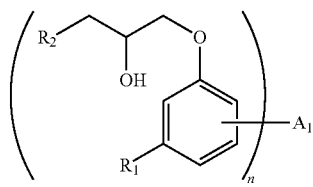

wherein:
$A_1$ is methylene; linear, branched and/or substituted alkyl (e.g. $C_1$-$C_{20}$, $C_2$-$C_{20}$, $C_2$-$C_{10}$, $C_2$-$C_{10}$, $C_1$—C, $C_2$-$C_8$, $C_1$-$C_6$, $C_2$-$C_6$, $C_1$-$C_4$, $C_2$-$C_4$, or $C_1$-$C_3$ alkyl); linear, branched and/or substituted aryl; linear, branched and/or substituted phenyl; linear, branched and/or substituted alkenyl (e.g. $C_1$-$C_{20}$, $C_2$-$C_{20}$, $C_2$-$C_{10}$, $C_2$-$C_{10}$, $C_1$-$C_8$, $C_2$-$C_8$, $C_1$-$C_6$, $C_2$-$C_6$, $C_1$-$C_4$, $C_2$-$C_4$, or $C_1$-$C_3$ alkenyl); —$CH_2$—(NH-alkyl-$NH_2$), where alkyl ($C_1$-$C_{20}$, $C_2$-$C_{20}$, $C_2$-$C_{10}$, $C_2$-$C_{10}$, $C_1$-$C_8$, $C_2$-$C_8$, $C_1$-$C_6$, $C_2$-$C_6$, $C_1$-$C_4$, $C_2$-$C_4$, or $C_1$-$C_3$ alkyl) can be linear, branched and/or substituted; —$CH_2$—(NH-aryl-$NH_2$), where aryl can be linear, branched and/or substituted; —$CH_2$—(NH-phenyl-$NH_2$), where phenyl can be linear, branched and/or substituted; —$CH_2$—N—($CH_2CH$—$R_5$—$O$)$_2$—($CH_2CH$—$R_5$—$O$)$_{0.10}$—H, where $R_5$ can be H or $CH_3$; halogen; amino; azido; or nitro;
$R_1$ is

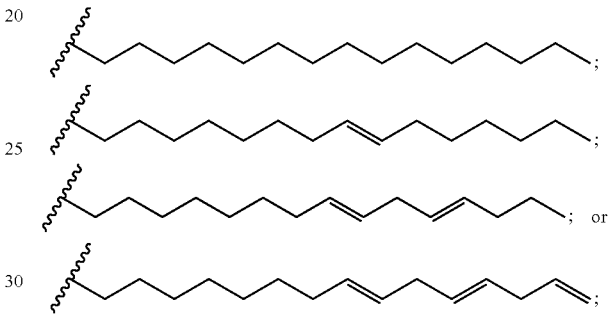

$R_2$ is 3-aminopropyltriethoxysilane; bis[(3-triethoxysilyl)propyl]amine; 3-aminopropyltrimethoxysilane; bis[(3-trimethoxysilyl)propyl]amine; 3-aminopropylmethyldiethoxysilane; 3-aminopropylmethyldimethoxysilane; aminoethylamino-propyl-trimethoxysilane; N-bis(3-(trimethylsiloxy)propyl)-1,2-ethanediamine; amino-ethyl-aminopropyl-triethoxysilane; amino-ethyl-aminopropyl-methyl-dimethoxysilane; diethylene-triamino-propyl-trimethoxysilane; diethylene-triamino-propyl-methyl-dimethoxysilane; piperazinyl-propyl-methyldimethoxysilane; (N-phenylamino)-methyl-triethoxysilane; or 3-(N-phenylamino)-propyl-trimethoxysilane; and n is 1-20.

In some embodiments, a compound comprising one or more units of Formula IV is provided:

IV

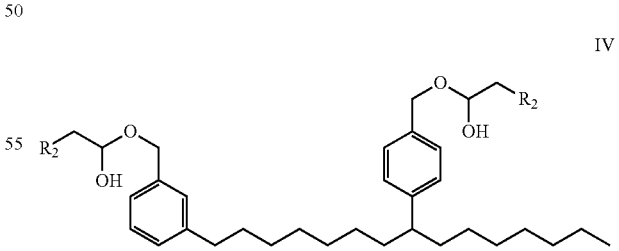

wherein
$R_2$ is independently selected from the group of 3-aminopropyltriethoxysilane; bis[(3-triethoxysilyl)propyl]amine; 3-aminopropyltrimethoxysilane; bis[(3-trimethoxysilyl)propyl]amine; 3-aminopropylmethyldiethoxysilane; 3-aminopropylmethyldimethoxysilane; aminoethylamino-propyltrimethoxysilane; N-bis(3-(trimethylsiloxy)propyl)-1,2-ethanediamine; amino-ethyl-aminopropyl-triethoxysilane; amino-ethyl-aminopropyl-methyl-dimethoxysilane; diethylene-triamino-propyl-trimethoxysilane; diethylene-triamino-propyl-methyl-dimethoxysilane; piperazinyl-propyl-methyldimethoxysilane; (N-phenylamino)-methyl-triethoxysilane; 3-(N-phenylamino)-propyl-trimethoxysilane In some embodiments, a compound of Formula V is provided:

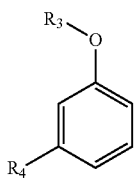

wherein
R₃ is H or —CH₂CH(OH)—CH₂-[3-aminopropyltri-ethoxysilane; bis[(3-triethoxysilyl)propyl]amine; 3-aminopropyltrimethoxysilane; bis[(3-trimethoxysilyl)propyl]amine; 3-aminopropylmethyl-diethoxysilane; 3-aminopropylmethyl-dimethoxysilane; aminoethylamino-propyl-trimethoxysilane; N-bis(3-(trimethylsiloxy)propyl)-1,2-ethanediamine; amino-ethyl-aminopropyl-triethoxysilane; amino-ethyl-aminopropyl-methyl-dimethoxysilane; diethylene-triamino-propyl-trimethoxysilane; diethylene-triamino-propyl-methyl-dimethoxysilane; piperazinyl-propyl-methyldimethoxysilane; (N-phenylamino)-methyl-triethoxysilane; or3-(N-phenylamino)-propyl-trimethoxysilane]
R₄ is

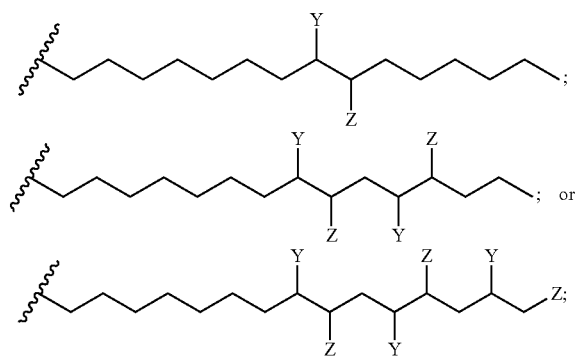

wherein Y is OH; 3-aminopropyltriethoxysilane; bis[(3-triethoxysilyl)propyl]amine; 3-aminopropyltrimethoxysilane; bis[(3-trimethoxysilyl)propyl]amine; 3-aminopropylmethyl-diethoxysilane; 3-aminopropylmethyl-dimethoxysilane; aminoethylamino-propyl-trimethoxysilane; N-bis(3-(trimethylsiloxy)propyl)-1,2-ethanediamine; amino-ethyl-aminopropyl-triethoxysilane; amino-ethyl-aminopropyl-methyl-dimethoxysilane; diethylene-triamino-propyl-trimethoxysilane; diethylene-triamino-propyl-methyl-dimethoxysilane; piperazinyl-propyl-methyldimethoxysilane; (N-phenylamino)-methyl-triethoxysilane; or 3-(N-phenylamino)-propyl-trimethoxysilane; and Z is OH; 3-aminopropyltriethoxysilane; bis[(3-triethoxysilyl)propyl]amine; 3-aminopropyltrimethoxysilane; bis[(3-trimethoxysilyl)propyl]amine; 3-aminopropylmethyl-diethoxysilane; 3-aminopropylmethyl-dimethoxysilane; aminoethylamino-propyl-trimethoxysilane; N-bis(3-(trimethylsiloxy)propyl)-1,2-ethanediamine; amino-ethyl-aminopropyl-triethoxysilane; amino-ethyl-aminopropyl-methyl-dimethoxysilane; diethylene-triamino-propyl-trimethoxysilane; diethylene-triamino-propyl-methyl-dimethoxysilane; piperazinyl-propyl-methyldimethoxysilane; (N-phenylamino)-methyl-triethoxysilane; or 3-(N-phenylamino)-propyl-trimethoxysilane.

In some embodiments, methods of producing a compound or composition described herein is provided. In some embodiments, the method comprises reacting a cardanol or a cardanol derivative with a hydrolyzable silane under suitable conditions to produce the compound. In some embodiments, the methods comprise reacting a cardanol substrate with an unsaturated hydrolyzable silane in the presence of the free radical initiator at a temperature ranging from about 100° C. to about 350° C. under an inert atmosphere that is substantially free from water.

In some embodiments, a composition comprising any compound described herein is provided. In some embodiments, the composition is an adhesion promoter in an epoxy and polyurethane formulations, a fiber sizing agent, a rubber, a thermoplastic material, a self-curable polymer for hydrophobic coatings, or any combination thereof.

DETAILED DESCRIPTION

As used herein, the terms "a" or "an" means that "at least one" or "one or more" unless the context clearly indicates otherwise.

As used herein, the term "alkyl" means a saturated hydrocarbon group which is straight-chained or branched. An alkyl group can contain from 1 to 20, from 2 to 20, from 1 to 10, from 2 to 10, from 1 to 8, from 2 to 8, from 1 to 6, from 2 to 6, from 1 to 4, from 2 to 4, from 1 to 3, or 2 or 3 carbon atoms. These can also be referred to the abbreviations of $C_1$-$C_{20}$, $C_2$-$C_{20}$, $C_2$-$C_{10}$, $C_2$-$C_{10}$, $C_1$—C, $C_2$-$C_8$, $C_1$-$C_6$, $C_2$-$C_6$, $C_1$-$C_4$, $C_2$-$C_4$, $C_1$-$C_3$, and the like. Examples of alkyl groups include, but are not limited to, methyl (Me), ethyl (Et), propyl (e.g., n-propyl and isopropyl), butyl (e.g., n-butyl, t-butyl, isobutyl), pentyl (e.g., n-pentyl, isopentyl, neopentyl), hexyl, isohexyl, heptyl, 4,4-dimethylpentyl, octyl, 2,2,4-trimethylpentyl, nonyl, decyl, undecyl, dodecyl, 2-methyl-1-propyl, 2-methyl-2-propyl, 2-methyl-1-butyl, 3-methyl-1-butyl, 2-methyl-3-butyl, 2-methyl-1-pentyl, 2,2-dimethyl-1-propyl, 3-methyl-1-pentyl, 4-methyl-1-pentyl, 2-methyl-2-pentyl, 3-methyl-2-pentyl, 4-methyl-2-pentyl, 2,2-dimethyl-1-butyl, 3,3-dimethyl-1-butyl, 2-ethyl-1-butyl, and the like. These can also be referred to the abbreviations of $C_1$-$C_{20}$, $C_2$-$C_{20}$, $C_1$-$C_6$, and the like.

As used herein, the term "about" means that the numerical value is approximate and small variations would not significantly affect the practice of the disclosed embodiments. Where a numerical limitation is used, unless indicated otherwise by the context, "about" means the numerical value can vary by ±10% and remain within the scope of the disclosed embodiments. Additionally, in phrase "about X to Y," is the same as "about X to about Y," that is the term "about" modifies both "X" and "Y."

As used herein, the term, "compound" means all stereoisomers, tautomers, and isotopes of the compounds described herein.

As used herein, the terms "comprising" (and any form of comprising, such as "comprise", "comprises", and "comprised"), "having" (and any form of having, such as "have" and "has"), "including" (and any form of including, such as "includes" and "include"), or "containing" (and any form of containing, such as "contains" and "contain"), are inclusive or open-ended and do not exclude additional, unrecited elements or method steps.

The term "halo" or "halogen" refers to fluoro, chloro, bromo, or iodo. In some embodiments, the halo groups are fluoro, chloro, and bromo. In some embodiments, the halo groups are fluoro and chloro.

Substituted alkyl, cycloalkyl, cycloalkylalkyl, alkoxy, or alkylthio, means an alkyl, cycloalkyl, cycloalkylalkyl, alkoxy, or alkythio group, respectively, substituted one or more times independently with a substituent selected from the group consisting of halo, hydroxy, and $C_1$-$C_3$ alkoxy or as provided for herein. By way of illustration, but without limitation, examples include trifluoromethyl, pentafluoroethyl, 5-fluoro-2-bromopentyl, 3-hydroxypropyloxy, 4-hydroxycyclohexyloxy, 2-bromoethylthio, 3-ethoxypropyloxy, 3-ethoxy-4-chlorocyclohexyl, and the like. In some embodiments, substitutions include substitution 1-5 times with halo, each independently selected, or substituted 1-3 times with halo and 1-2 times independently with a group selected from hydroxy and $C_1$-$C_3$ alkoxy, or substituted 1-3 times independently with a group selected from hydroxy and $C_1$-$C_3$ alkoxy, provided that no more than one hydroxy and/or alkoxy substituent may be attached through the same carbon.

As the term "aryl" is provided for herein it can be either a monocyclic aromatic group or a bicyclic aromatic group, which may contain heteroatoms in the aromatic group (e.g. heteroaryl). The following structures are some non-limiting examples of representative aryl groups, but the aryl groups are not limited to those examples:

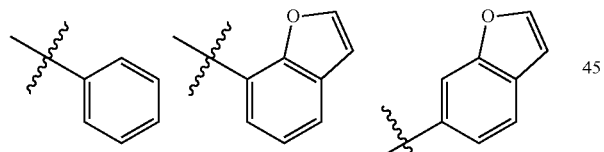

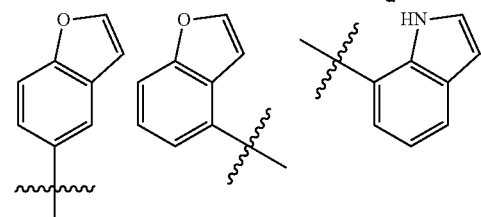

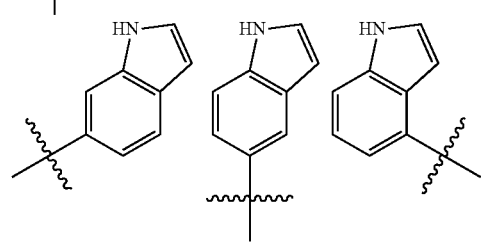

-continued

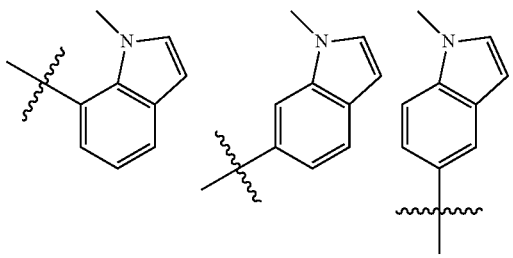

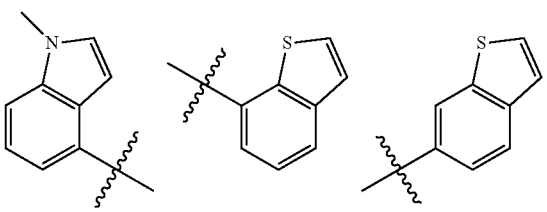

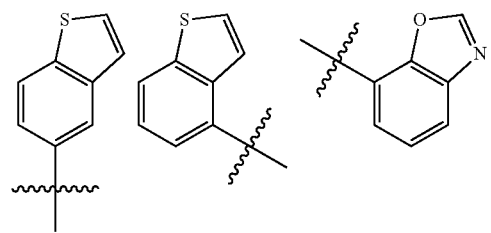

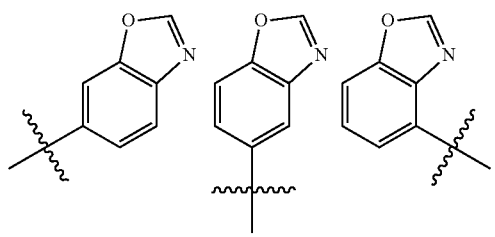

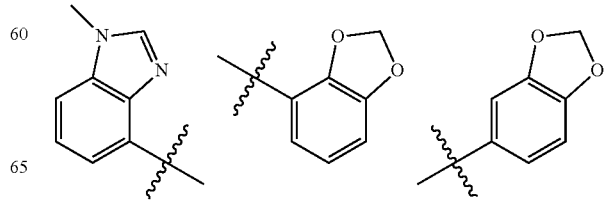

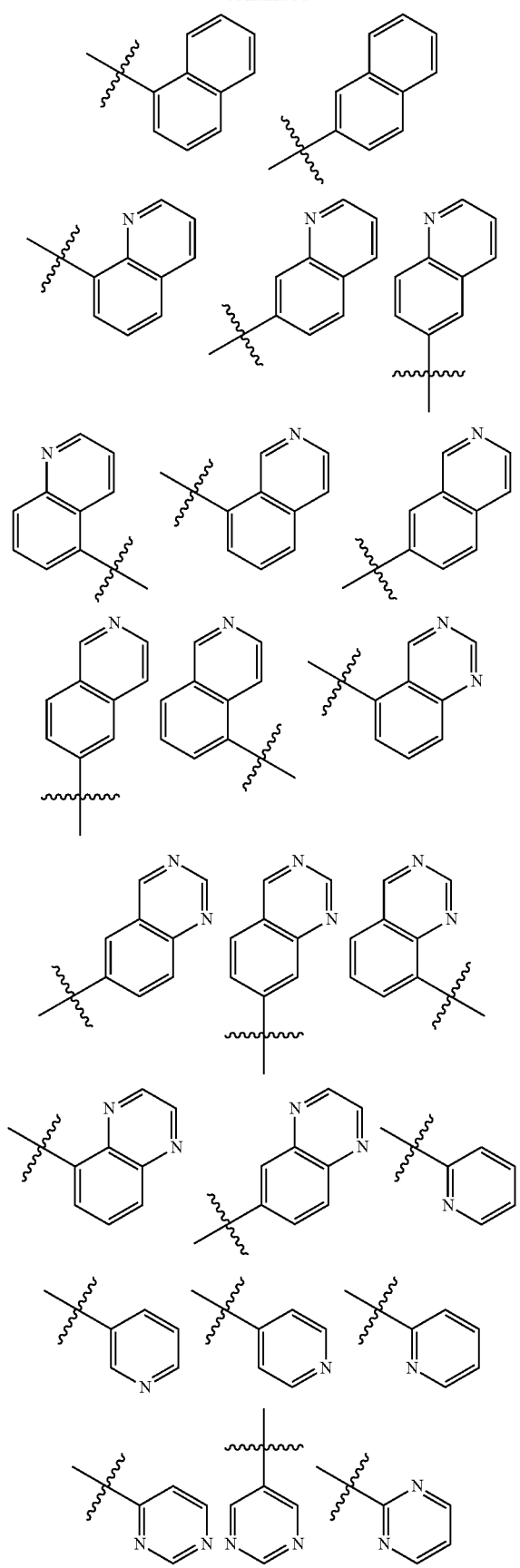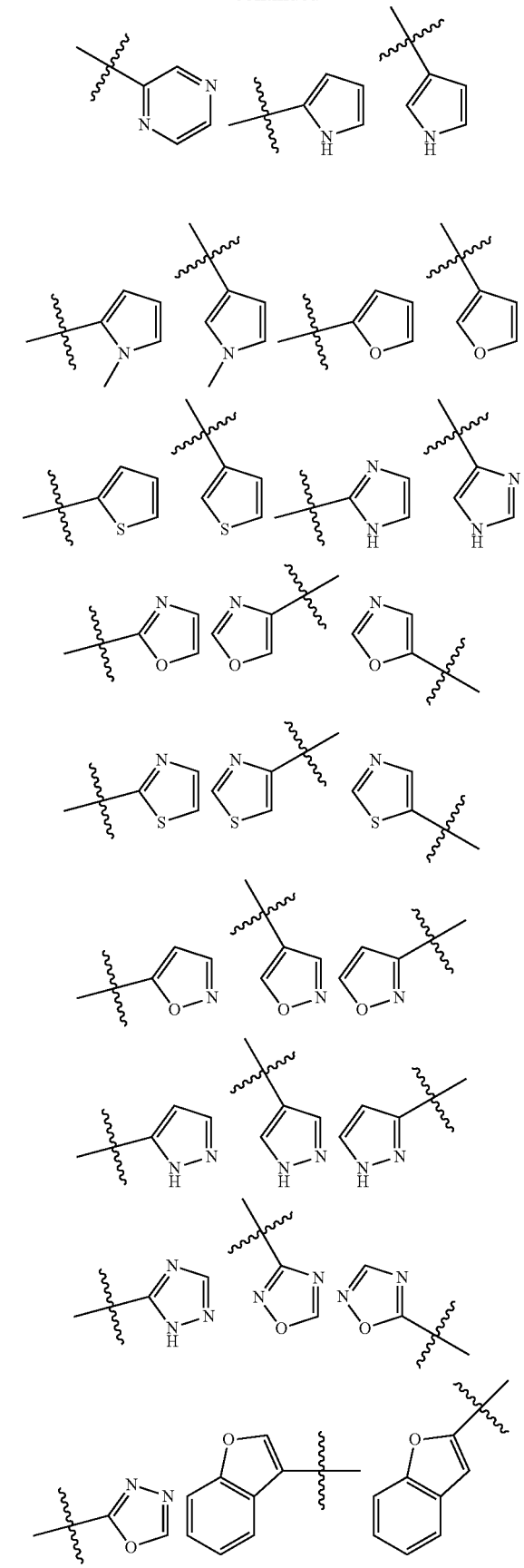

-continued

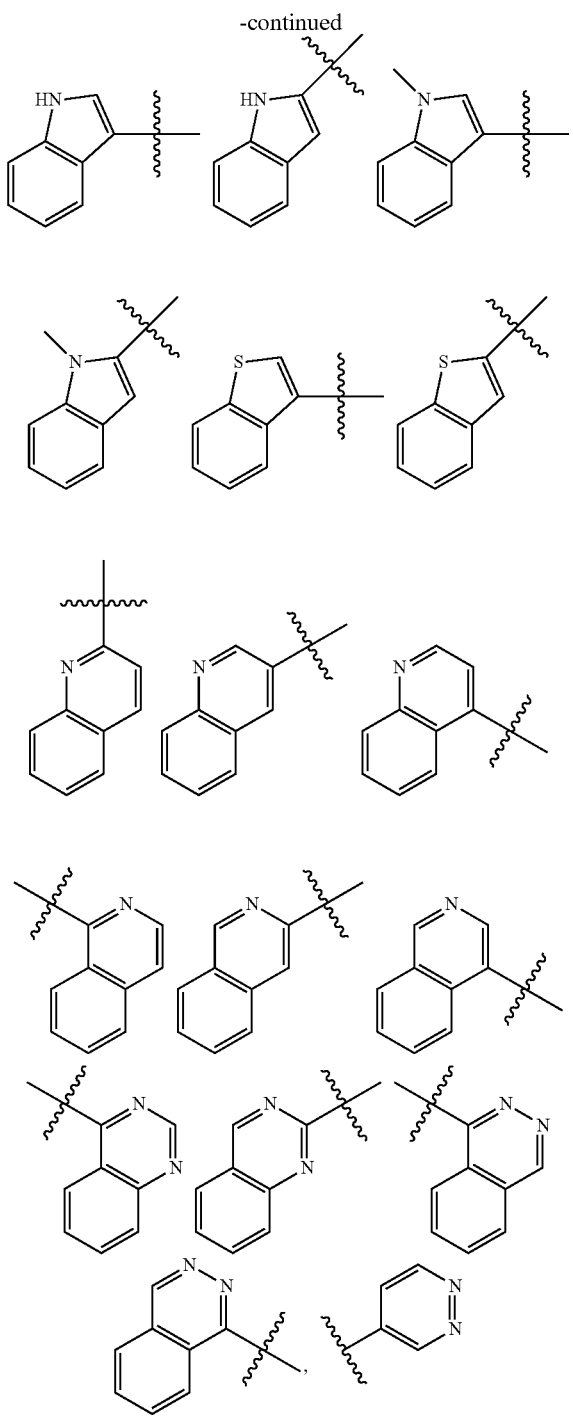

In some embodiments, the aryl group is not a heteroaryl group. In some embodiments, the aryl group is heteroaryl.

The terms "substituted phenyl", "substituted aryl" and "substituted heterocycle" are taken to mean that the cyclic moiety in either case is substituted. They can be substituted independently with one or more substituents. They can be substituted independently with 1, 2, 3, 4, 5, 1-3, 1-4, or 1-5 substituents or as provided for herein. The substitution can be, independently, halo, alkyl, such as but not limited to, $C_1$-$C_4$ alkyl, alkoxy, such as but not limited to, $C_1$-$C_4$ alkoxy, and alklylthio, such as but not limited to, $C_1$-$C_4$ alkylthio, wherein each alkyl, alkoxy and alkylthio substituent can be further substituted independently with $C_1$-$C_2$ alkoxy or with one to five halo groups; or substituted with one substituent selected from the group consisting of phenyloxy, benzyloxy, phenylthio, benzylthio, and pyrimidinyloxy, wherein the phenyloxy, benzyloxy, phenylthio, benzylthio, and pyrimidinyloxy moiety can be further substituted with one to two substituents selected from the group consisting of halo, $C_1$-$C_2$ alkyl, and $C_1$-$C_2$ alkoxy; or substituted with one substituent selected from the group consisting of $C_1$-$C_4$ acyl and $C_1$-$C_4$ alkoxycarbonyl, and further substituted with zero to one substituent selected from the group consisting of halo, $C_1$-$C_4$ alkyl, $C_1$-$C_4$ alkoxy, and $C_1$-$C_4$ alkylthio. When a substituent is halo, in some embodiments, the halo groups are fluoro, chloro, and bromo. The halo can also be iodo.

In some embodiments, cashew nut shell liquid derivatives ("CNSL") based organosilicon products are provided by reacting the CNSL, which includes, for example, cardanol, with silanes, such as, but not limited to, vinylsilanes. In some embodiments, these silylated-cardanol derivatives can be further modified to form suitable raw materials for coatings and adhesives compositions, providing better adhesion properties and moisture resistance. Methods for preparing such organosilicon products based on cardanol and its derivatives are provided herein. The presently described compounds and methods of making the same, such as, but not limited to, silylated mono- and multifunctional cardanol derivatives overcome the limitations of existing silylated natural oils. The presently described compounds demonstrate higher hardness and hydrophobicity due to the presence of the aromatic ring as well as improved hydrolytic stability due to the absence of hydrolyzable bonds like ester groups. Additionally, the introduction of silane groups on different position of the cardanol-backbone can provide different mechanical, thermal and cure properties to the final formulated systems where the new derivatives are used, spacing from epoxy to polyurethane matrices to fibers sizing agents.

Cardanol is a meta substituted phenol obtained by treating cashew nut shell liquid (CNSL). It contains 15 carbon unsaturated aliphatic side chain at the meta position. This aliphatic side chain may have either one, two or three carbon-carbon double bonds. This unsaturation can be used to derivatize useful chemicals from cardanol which can used for coatings, adhesives, sealants, rubbers, elastomers etc. applications.

In some embodiments, cardanol or other cardanol derivatives can be reacted with alkene-terminated silanes through the unsaturation present on the aliphatic side chain of the cardanol compound to produce organosilicon materials that provide the useful properties of silanes as well as cardanol. These products can be used for numerous applications.

In some embodiments, silylation through 'ene' type mechanism is used to graft silanes on non-terminal double bonds. The production of silane modified cardanol derivatives due to the presence of the aromatic ring at one end of the unsaturated chain provides better mechanical strength to the final product and therefore, can be used effectively for variety of applications, whereas previous silane modified oils could be used in the same manner. In some embodiments, the hydroxyl group present on the phenol ring of cardanol can react with the alkoxy groups of silane, and provide added functionality on the molecule.

In some embodiments, cardanol's silylation reaction proceeds via 'ene' mechanism, as shown in the following non-limiting scheme:

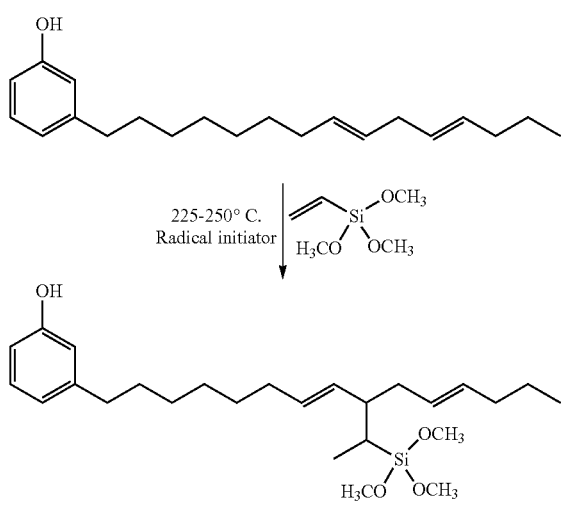

In some embodiments, in the presence of peroxide catalyst, the vinylsilane grafts on the unsaturation present on the long chain without consuming the unsaturation, but simply shifting it to the next carbon. This is shown as a non-limiting example the schemes provided herein.

In some embodiments, the peroxide catalyst is as free radical initiator. In some embodiments, the peroxide catalyst is selected in the group consisting of benzoyl peroxide, di-t-butylperoxide, 2,5-dimethyl-2,5-di (t-butylperoxide) hexane, bis-(methylbenzoyl)peroxide, bis(dimethylbenzoyl) peroxide, dicumylperoxide, t-butyl 3-isopropenylcumyl peroxide, butyl 4,4-bis(tert-butylperoxy)valerate, bis(trimethylbenzoyl)peroxide, and combinations thereof. The catalyst can be one or a combination of different peroxide catalysts.

In some embodiments, the peroxide catalyst level is from about 0.2% to about 3%, about 0.5% to about 2%, about 0.5% to about 1.5%, about 0.75% to about 1.25%, about 1% to about 2%, or about 1% w/w with respect to the substrate (e.g. cardanol).

The silane coupling agent can be any suitable unsaturated silane coupling agent. In some embodiments, the silane coupling agents has a formula of

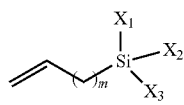

wherein,
m is independently 0-20;
$X_1$, is a hydrolyzable group selected from chloro, methoxy, propoxy, methylalkoxy, acetoxy, silazanes, oximes, and the like;
$X_2$ is a saturated or unsaturated hydrocarbon chain of 1-20 carbon atoms, or is hydrolyzable group selected from chloro, methoxy, propoxy, methylalkoxy, acetoxy, silazanes, oximes, and the like; $X_3$ is a saturated or unsaturated hydrocarbon chain of 1-20 carbon atoms, or is hydrolyzable group selected from chloro, methoxy, propoxy, methylalkoxy, acetoxy, silazanes, oximes, and the like.

Cardanol derivative/silane coupling agent molar ratio can range from about 1 to about 0.5, about 1 to 1, or about 1:2, including all ratios in between. However these are only exemplary ratios and are not intended to be limiting. Other combinations can be used and can be adjusted depending on the specific reagents used.

In some embodiments, the silane coupling reaction is performed in a pressurized vessel under an inert (e.g. nitrogen) atmosphere to prevent hydrolysis. In some embodiments, the reaction is heated, which without being bound by any theory, improves conversion rates and yields. In some embodiments, the pressure can be from about 5 to about 20 bars. In some embodiments, the temperature can be from about 140° C. to 350° C.

Without being bound to any particular theory, under the conditions described herein, the 'ene' reaction can proceed in an efficient manner due to the fact that unsaturated hydrolyzable silanes do not undergo thermal polymerization like common vinyl monomers such as styrene, acrylates and similar vinyl monomers. Additionally, cardanol contains very minimal amount of completely saturated long chain which cannot participate in the silylation reaction through unsaturation, but still can react via phenolic OH group.

In some embodiments, the starting material is a cardanol derivative, such as cardanol glycidyl ether and cardanol epoxy derivatives. For cardanol glycidyl ether and cardanol epoxy derivatives the silylation occurs, for example, through the unsaturation present on the unsaturated side chain as shown in the non-limiting scheme as illustrated here:

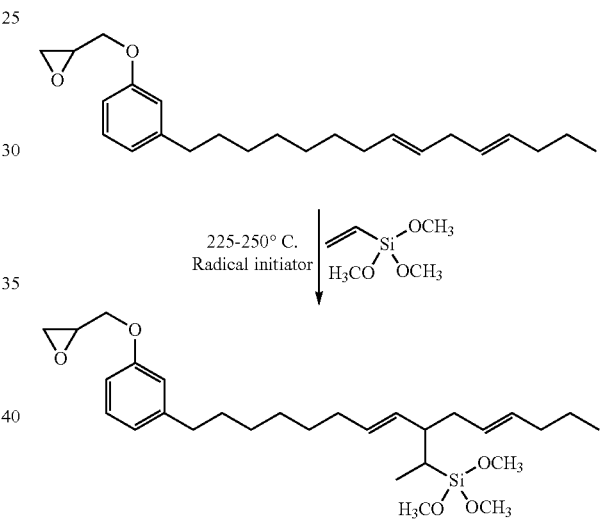

This example illustrates that the silane molecule does not react with the epoxies present on the aromatic ring as in the case of phenolic OH present on cardanol. The final silylated product provides dual functionality; epoxy and alkoxysilane.

In addition to cardanol, other cardanol-derivatives suitable to run unsaturated hydrolyzable silanes addition through "ene" reaction can be alkylated cardanol (e.g. butylated cardanol), alkoxylated cardanol grades with a number of ethylene oxide or propylene oxide units ranging from 1 to 20, mono and multifunctional epoxy derivatives (e.g. Cardolite NC-513, UL-513, NC-547, NC-514, GX-2551), cardanol derived esters, including acrylates and methacrylates. These are only non-limiting examples of cardanol derivatives that can be used in an "ene" reaction and other can be used.

The purity of the starting cardanol and cardanol derivatives can vary from about 80% to about 99.5%, or 90% to about 95%.

The extent of unsaturated hydrolysable silanes can be quantified using standard analytical techniques. For example, with thermogravimetric analysis (TGA) the sample can be isothermally heated at 130° C. (above the boiling point of silanes) for several minutes, and the unreacted silane is measured based on the weight loss variation. Table 1 indicates examples of the number of moles of silane grafted calculated for the silylation reaction with different molar ratios of cardanol and cardanol glycidyl ether with silane.

TABLE 1 examples of conversion of cardanol or cardanol-substrates to the corresponding silylated derivatives

| Substrate | molar ratio [substrate:silane] | Reaction Temperature [° C.] | number of moles of silane grafted |
|---|---|---|---|
| Cardanol | 1:0.5 | 225 | 0.37 |
|  | 1:0.5 | 250 | 0.42 |
|  | 1:2 | 225 | 0.67 |
| Cardanol | 1:0.5 | 225 | 0.31 |
| Glycidyl | 1:0.5 | 250 | 0.34 |
| Ether | 1:2 | 225 | 0.61 |

The findings from thermogravimetric analysis can be confirmed by gel permeation chromatography (GPC) and high-performance liquid chromatography (HPLC) results.

In some embodiments, to further improve the conversion rate of the silane addition on cardanol and cardanol derivatives side chain, a preliminary side chain activation step can be performed, by conjugating the double bonds by isomerization. Isomerization can be performed under any suitable conditions, such as described in WO2008131918, which is hereby incorporated by reference in its entirety.

In some embodiments, epoxidized cardanol derivatives (with the epoxy groups on the phenoxy OH or on the side chain double bonds or on both the positions) are used as substrates to be reacted with amino-functional hydrolyzable silanes, the reaction is run under milder conditions with respect to previous derivatives.

In some embodiments, a non-limiting example of synthesis of an amino-functional hydrolyzable silane obtained from a cardanol-based glycidyl ether (e.g. Cardolite NC-513 or Cardolite UL-513) can be performed according to the following scheme:

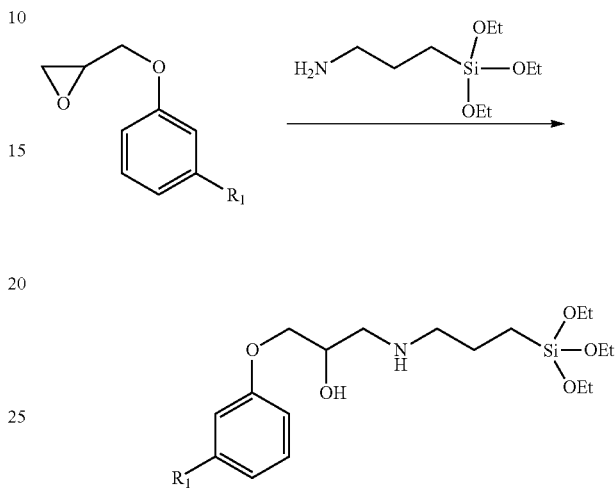

In some embodiments, a non-limiting example of synthesis of a multi-amino-functional hydrolyzable silane obtained from a cardanol-based di-functional glycidyl ether epoxy resin (e.g. Cardolite NC-514 or Cardolite NC-514S) can be performed according to the following scheme.

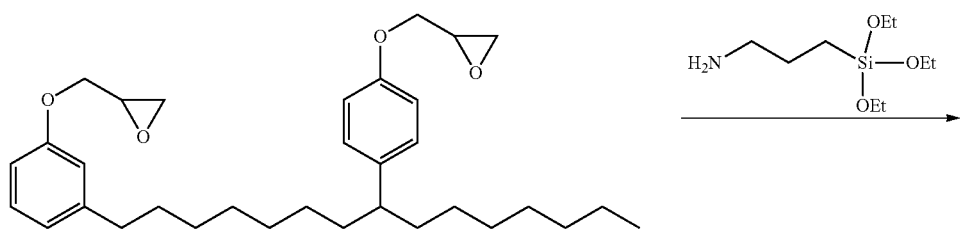

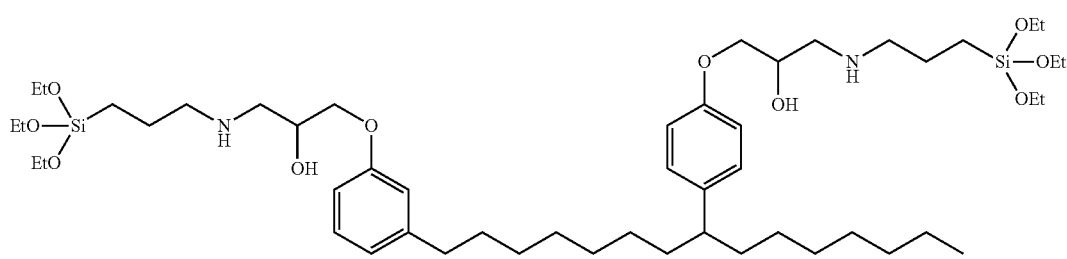

In some embodiments, a non-limiting example of synthesis of a multi-amino-functional hydrolyzable silane obtained from a cardanol-based epoxy resin (e.g. Cardolite GX-2551) can be performed according to the following scheme.

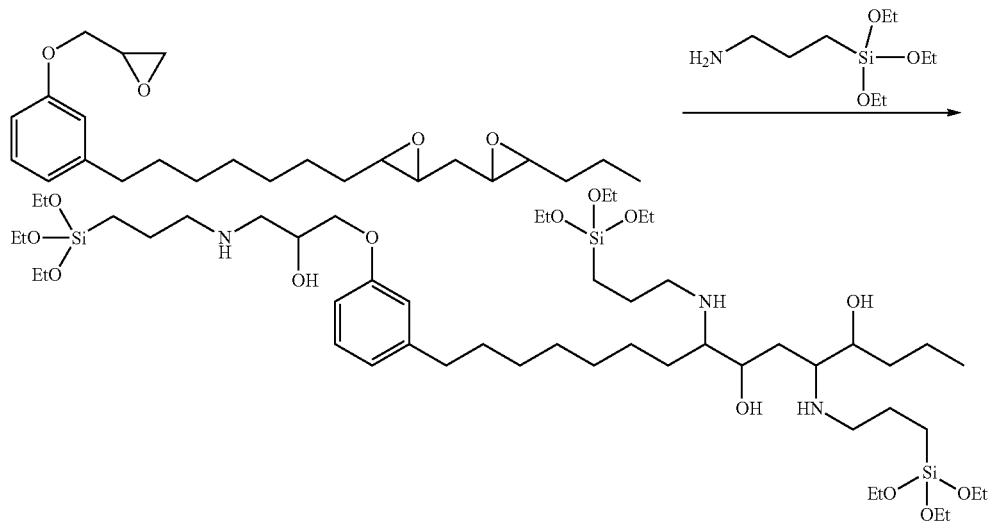

For example, in some embodiments, according to the schemes provided for herein or others apparent to one of skill in the art cardanol-based epoxy derivatives can be reacted under nitrogen atmosphere with suitable amino-functional hydrolyzable silanes (or their combinations) in a temperature range from about 0° C. to about 90° C. or about 20° C. to about 40° C. The amount of the silane nucleophiles is determined on the basis of each substrates epoxy equivalent weight and desired conversion. Other conditions are possible depending on raw materials selection.

The moisture activated cure of alkoxy terminated is well known in the literature and it is based on hydrolyzable Si—O—C linkages. Upon contact with moisture, the Si—O—C linkages in the silylated product are hydrolyzed to form Si—OH (silanols), which further react with another such silanols to form a flexible and stable Si—O—Si linkages by condensation. This moisture cure is thus a two-step mechanism as schematically shown the following scheme.

The reaction can occur at room temperature and by, for example, action of atmospheric moisture. That is, in some embodiments, no exogenous water is added to the reaction to cure the compound.

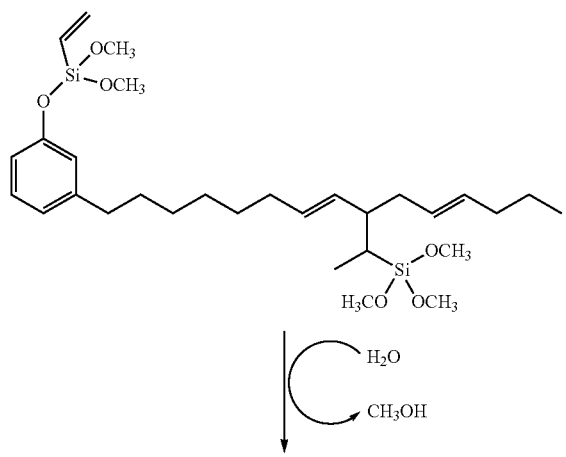

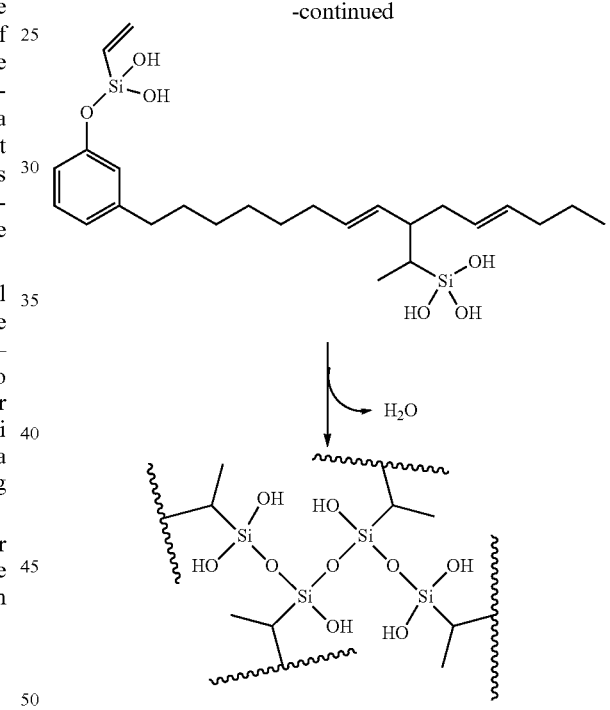

This scheme is a non-limiting example of moisture activated cure of silylated cardanol. Other schemes can also be used.

Cardanol is one of the most promising bio-based material used in the coatings industry, by derivatizing through the aromatic ring and phenolic OH. Phenalkamines and Phenalkamides derived from cardanol captured a huge market as epoxy curing agents in the coatings industry. Also, cardanol glycidyl ether with epoxy functionality on cardanol has been a popular bio-based substitute in the coatings, adhesives industries. Silylation provides an excellent opportunity to add one more functionality to these molecules using 'under-utilized' side chain unsaturation. Although the cure mechanism for silanes is quite different than traditional epoxy curing mechanism, it doesn't require any more additives and simply occurs just by utilizing atmospheric moisture. Interestingly, it adds the flexible and stable Si—O—Si (siloxane) linkages that could aid the physical properties of the final cured structure when necessary. Silanes are very popular for the ability as adhesion promotor and providing excellent moisture resistance. The multifunctionality provided by silylation to cardanol and its derivatives, can be very vital for improving existing application attributes and as well as developing new applications.

In some embodiments, a compound comprising one or more units of the formula

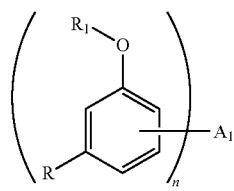

wherein $A_1$ is methylene; linear, branched and/or substituted alkyl (e.g. $C_1$-$C_{20}$, $C_2$-$C_{20}$, $C_2$-$C_{10}$, $C_2$-$C_{10}$, $C_1$—C, $C_2$-$C_8$, $C_1$-$C_6$, $C_2$-$C_6$, $C_1$-$C_4$, $C_2$-$C_4$, or $C_1$-$C_3$ alkyl); linear, branched and/or substituted aryl; linear, branched and/or substituted phenyl; linear, branched and/or substituted alkenyl (e.g. $C_1$-$C_{20}$, $C_2$-$C_{20}$, $C_2$-$C_{10}$, $C_2$-$C_{10}$, $C_1$-$C_8$, $C_2$-$C_8$, $C_1$-$C_6$, $C_2$-$C_6$, $C_1$-$C_4$, $C_2$-$C_4$, or $C_1$-$C_3$ alkenyl); —CH$_2$—(NH-alkyl-NH$_2$), where alkyl ($C_1$-$C_{20}$, $C_2$-$C_{20}$, $C_2$-$C_{10}$, $C_2$-$C_{10}$, $C_1$-$C_8$, $C_2$-$C_8$, $C_1$-$C_6$, $C_2$-$C_6$, $C_1$-$C_4$, $C_2$-$C_4$, or $C_1$-$C_3$ alkyl) can be linear, branched and/or substituted; —CH$_2$—(NH-aryl-NH$_2$), where aryl can be linear, branched and/or substituted; —CH$_2$—(NH-phenyl-NH$_2$), where phenyl can be linear, branched and/or substituted; —CH$_2$—N—(CH$_2$CH—R$_5$—O)$_2$—(CH$_2$CH—R$_5$—O)$_{0.10}$—H, where $R_5$ can be H or CH$_3$; halogen; amino; azido; or nitro;

$R_1$ is hydrogen, an epoxy, an alkyl, an ether or an ester group;

n is 1-20; and

R is

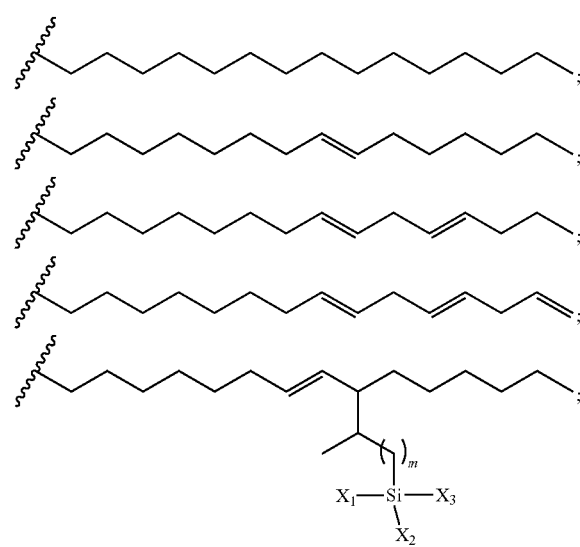

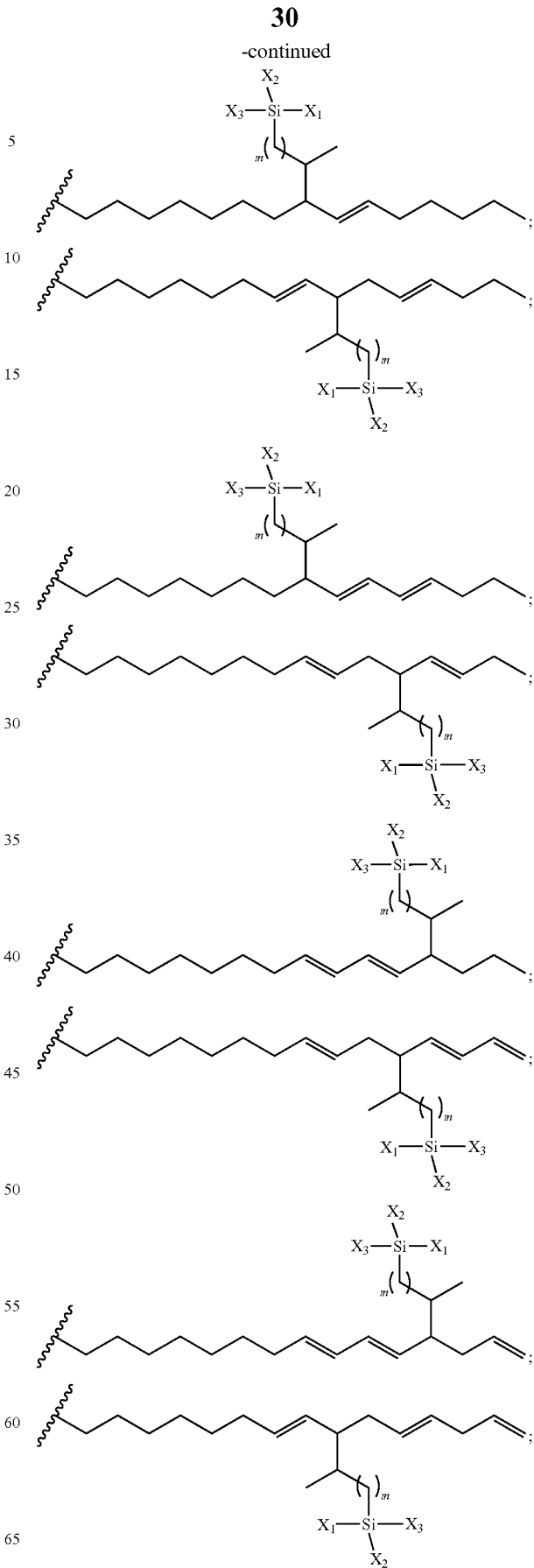

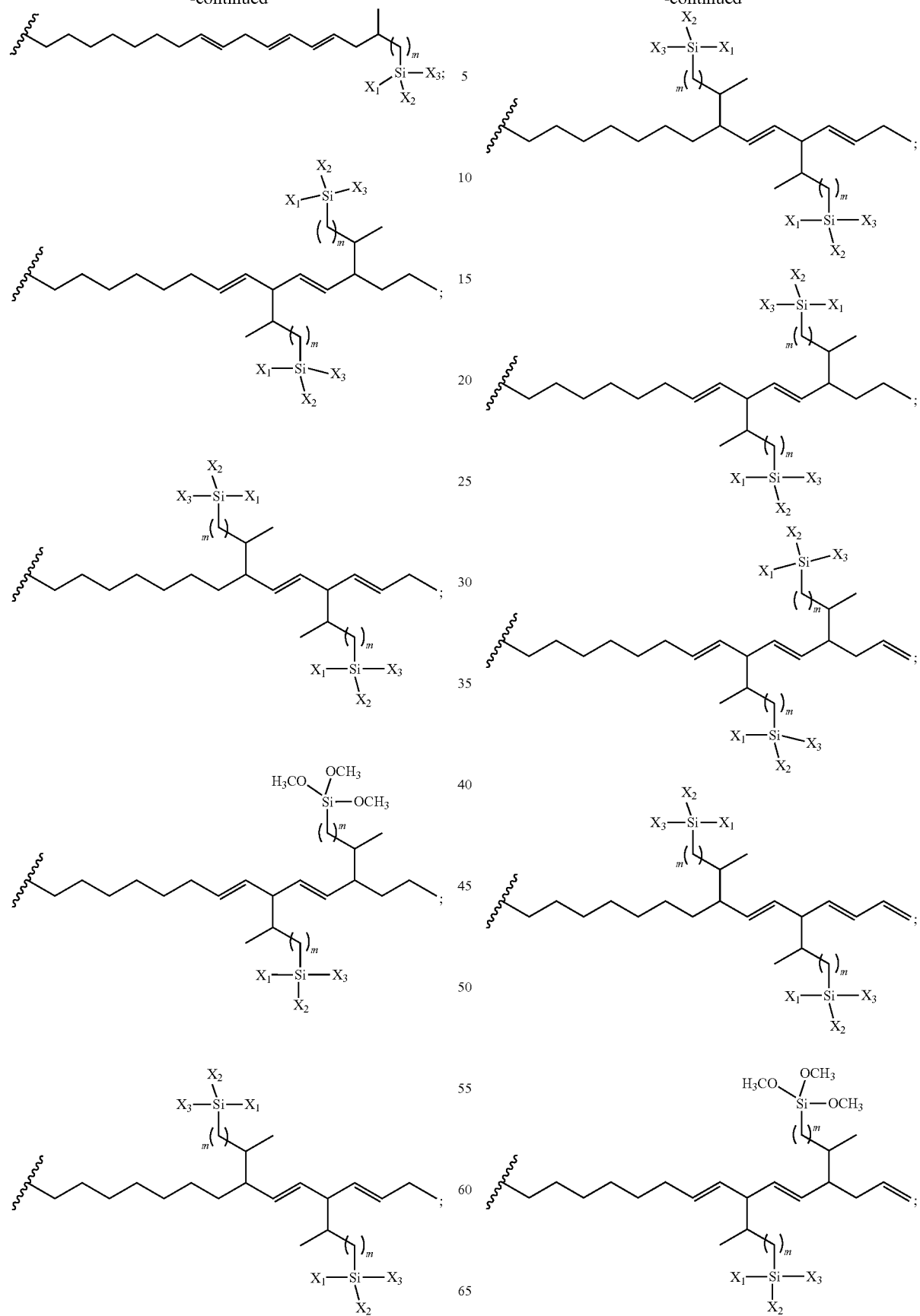

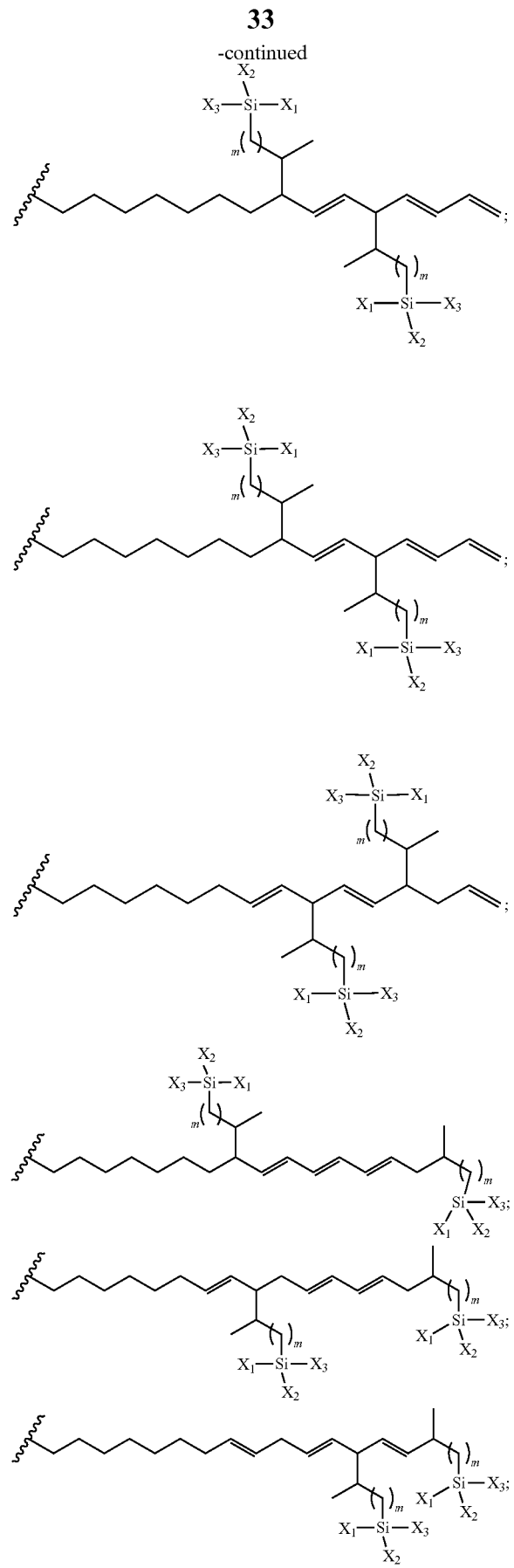

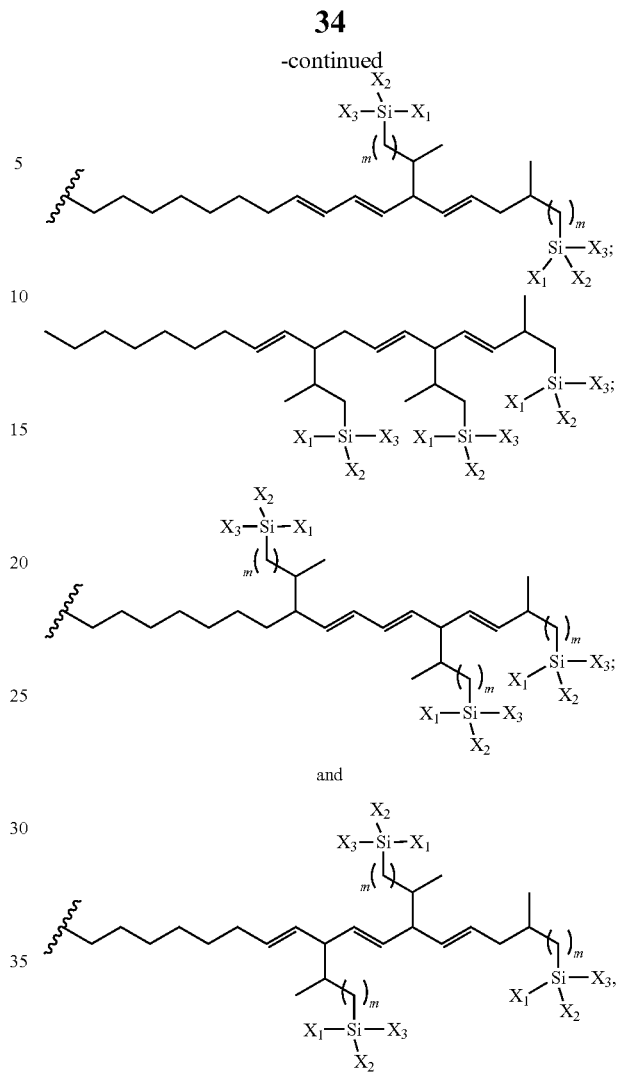

and wherein m is independently 0-20;

X₁ is independently a hydrolyzable group selected from chloro, methoxy, propoxy, methylalkoxy, acetoxy, silazanes, oximes, and the like;

X₂ is independently a saturated or unsaturated hydrocarbon chain of 1-20 carbon atoms, or is hydrolyzable group selected from chloro, methoxy, propoxy, methylalkoxy, acetoxy, silazanes, oximes, and the like; and X₃ is independently a saturated or unsaturated hydrocarbon chain of 1-20 carbon atoms, or is hydrolyzable group selected from chloro, methoxy, propoxy, methylalkoxy, acetoxy, silazanes, oximes, and the like.

In some embodiments, A1 is methylene; linear, branched and/or substituted alkyl(e.g. $C_1$-$C_{20}$, $C_2$-$C_{20}$, $C_2$-$C_{10}$, $C_2$-$C_{10}$, $C_1$-$C_8$, $C_2$-$C_8$, $C_1$-$C_6$, $C_2$-$C_6$, $C_1$-$C_4$, $C_2$-$C_4$, or $C_1$-$C_3$ alkyl). In some embodiments, the alkyl is $C_1$-$C_{20}$ alkyl. In some embodiments, the alkyl is $C_2$-$C_2$ alkyl.

In some embodiments, the alkyl is $C_2$-$C_{10}$ alkyl. In some embodiments, the alkyl is $C_1$-$C_8$ alkyl. In some embodiments, the alkyl is $C_2$-$C_5$ alkyl. In some embodiments, the alkyl is $C_1$-$C_6$alkyl. In some embodiments, the alkyl is $C_2$-$C_6$ alkyl. In some embodiments, the alkyl is $C_1$-$C_4$ alkyl. In some embodiments, the alkyl is $C_2$-$C_4$ alkyl. In some embodiments, the alkyl is $C_1$-$C_3$ alkyl.

In some embodiments, A1 is linear, branched and/or substituted aryl; linear, branched and/or substituted phenyl;

linear, branched and/or substituted alkenyl (e.g. $C_1$-$C_{20}$, $C_2$-$C_{20}$, $C_2$-$C_{10}$, $C_2$-$C_{10}$, $C_1$-$C_8$, $C_2$-$C_8$, $C_1$-$C_6$, $C_2$-$C_6$, $C_1$-$C_4$, $C_2$-$C_4$, or $C_1$-$C_3$ alkenyl). In some embodiments, the alkenyl is $C_1$-$C_{20}$ alkenyl. In some embodiments, the alkenyl is $C_2$-$C_2O$ alkenyl. In some embodiments, the alkenyl is $C_2$-$C_{10}$ alkenyl. In some embodiments, the alkenyl is $C_1$-$C_8$ alkenyl. In some embodiments, the alkenyl is $C_2$-$C_8$ alkenyl. In some embodiments, the alkenyl is $C_1$-$C_6$ alkenyl. In some embodiments, the alkenyl is $C_2$-$C_6$ alkenyl. In some embodiments, the alkenyl is $C_1$-$C_4$ alkenyl. In some embodiments, the alkenyl is $C_2$-$C_4$ alkenyl. In some embodiments, the alkenyl is $C_1$-$C_3$ alkenyl.

In some embodiments, A1 is —$CH_2$—(NH-alkyl-$NH_2$), where alkyl (e.g. $C_1$-$C_{20}$, $C_2$-$C_{20}$, $C_2$-$C_{10}$, $C_2$-$C_{10}$, $C_1$-$C_8$, $C_2$-$C_8$, $C_1$-$C_6$, $C_2$-$C_6$, $C_1$-$C_4$, $C_2$-$C_4$, or $C_1$-$C_3$ alkyl) can be linear, branched and/or substituted. In some embodiments, the alkyl is $C_2$-$C_2$ alkyl. In some embodiments, the alkyl is $C_2$-$C_{10}$ alkyl. In some embodiments, the alkyl is $C_1$-$C_8$ alkyl. In some embodiments, the alkyl is $C_2$-$C_8$ alkyl. In some embodiments, the alkyl is $C_1$-$C_6$ alkyl.

In some embodiments, the alkyl is $C_2$-$C_6$ alkyl. In some embodiments, the alkyl is $C_1$-$C_4$ alkyl. In some embodiments, the alkyl is $C_2$-$C_4$ alkyl. In some embodiments, the alkyl is $C_1$-$C_3$ alkyl.

In some embodiments, A1 is —$CH_2$—(NH-aryl-$NH_2$), where aryl can be linear, branched and/or substituted.

In some embodiments, A1 is —$CH_2$—(NH-phenyl-$NH_2$), where phenyl can be linear, branched and/or substituted; In some embodiments, A1 is —$CH_2$—N—($CH_2CH$—$R_5$—O)$_2$—($CH_2CH$—$R_5$—O)$_{0.10}$—H, where $R_5$ can be H or $CH_3$; halogen; amino; azido; or nitro.

In some embodiments, a compound comprising one or more units of the formula is provided:

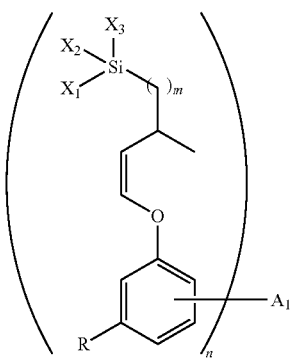

II wherein:
$A_1$ is methylene; linear, branched and/or substituted alkyl (e.g. $C_1$-$C_{20}$, $C_2$-$C_{20}$, $C_2$-$C_{10}$, $C_2$-$C_{10}$, $C_1$—C, $C_2$-$C_8$, $C_1$-$C_6$, $C_2$-$C_6$, $C_1$-$C_4$, $C_2$-$C_4$, or $C_1$-$C_3$ alkyl); linear, branched and/or substituted aryl; linear, branched and/or substituted phenyl; linear, branched and/or substituted alkenyl (e.g. $C_1$-$C_{20}$, $C_2$-$C_{20}$, $C_2$-$C_{10}$, $C_2$-$C_{10}$, $C_1$-$C_8$, $C_2$-$C_8$, $C_1$-$C_6$, $C_2$-$C_6$, $C_1$-$C_4$, $C_2$-$C_4$, or $C_1$-$C_3$ alkenyl); —$CH_2$—(NH-alkyl-$NH_2$), where alkyl ($C_1$-$C_{20}$, $C_2$-$C_{20}$, $C_2$-$C_{10}$, $C_2$-$C_{10}$, $C_1$-$C_8$, $C_2$-$C_8$, $C_1$-$C_6$, $C_2$-$C_6$, $C_1$-$C_4$, $C_2$-$C_4$, or $C_1$-$C_3$ alkyl) can be linear, branched and/or substituted; —$CH_2$—(NH-aryl-$NH_2$), where aryl can be linear, branched and/or substituted; —$CH_2$—(NH-phenyl-$NH_2$), where phenyl can be linear, branched and/or substituted; —$CH_2$—N—($CH_2CH$—$R_5$—O)$_2$—($CH_2CH$—$R_5$—O)$_{0.10}$—H, where $R_5$ can be H or $CH_3$; halogen; amino; azido; or nitro;

R is

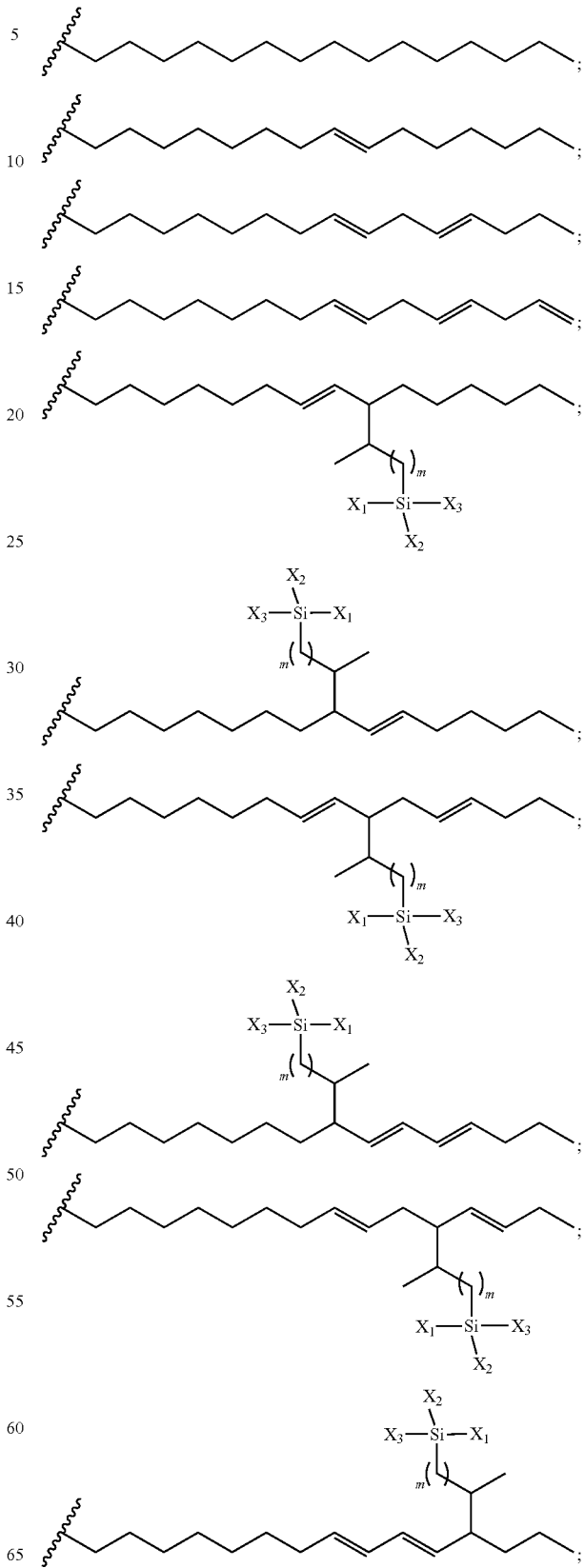

37
-continued
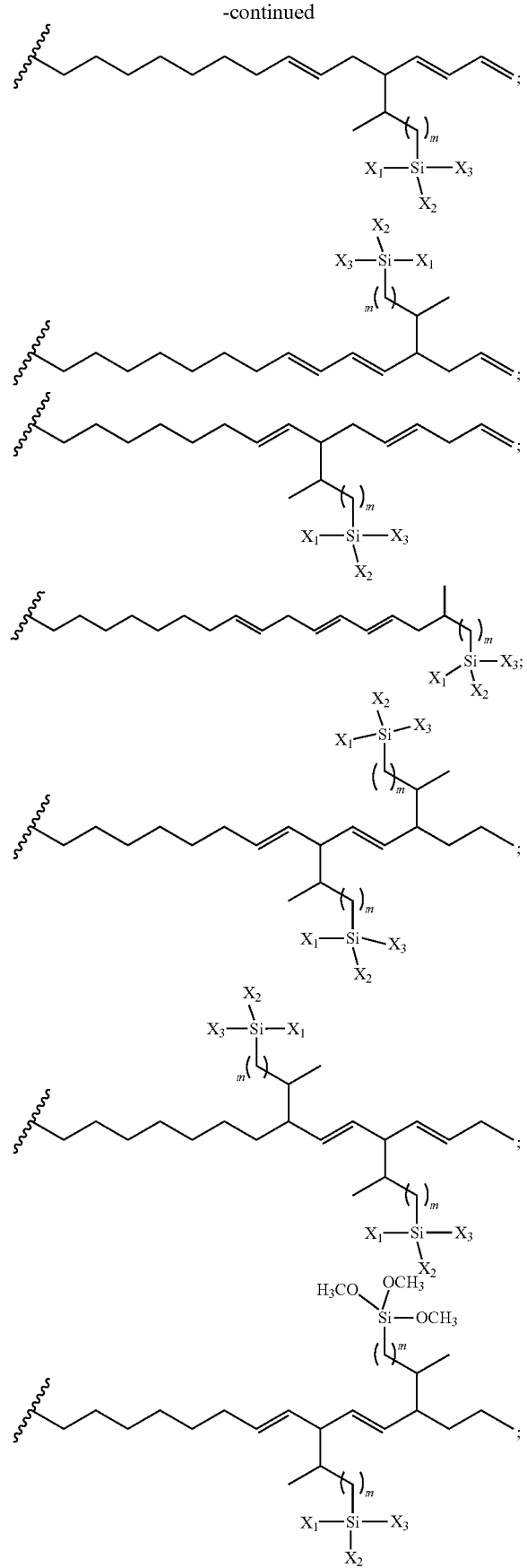
38
-continued
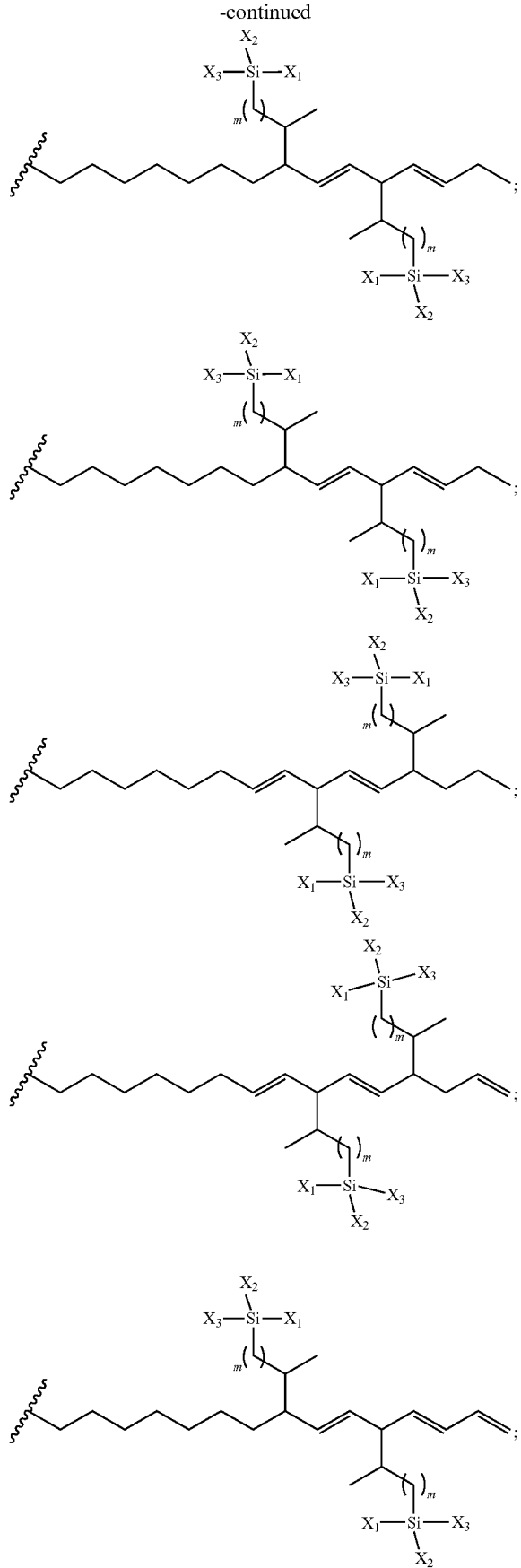

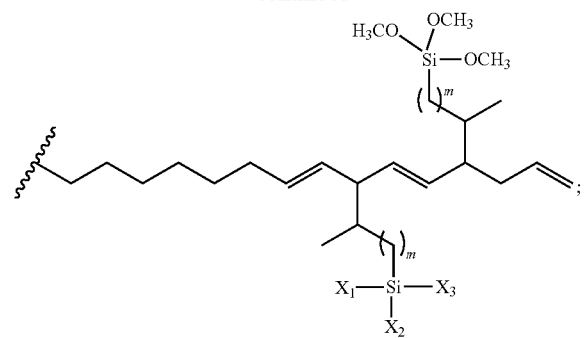

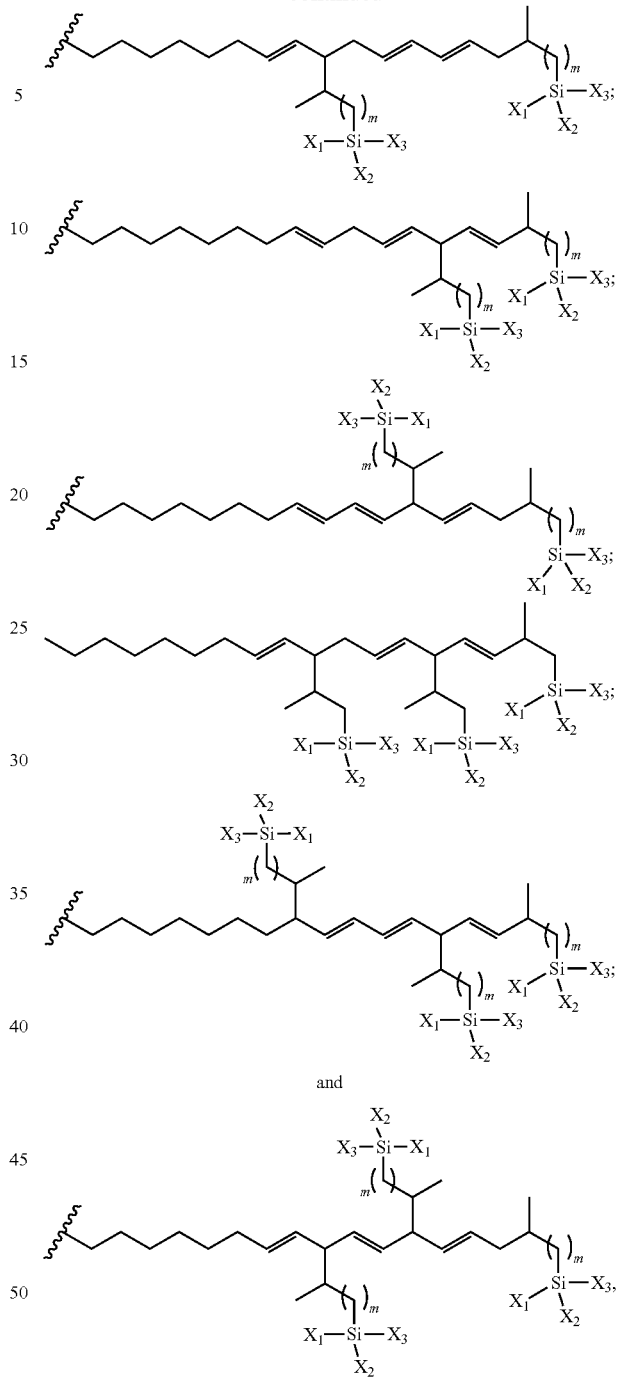

wherein
n is 1-20;
m is independently 0-20;
X₁ is independently a hydrolyzable group selected from chloro, methoxy, propoxy, methylalkoxy, acetoxy, silazanes, oximes, and the like;
X₂ is independently a saturated or unsaturated hydrocarbon chain of 1-20 carbon atoms, or is hydrolyzable group selected from chloro, methoxy, propoxy, methylalkoxy, acetoxy, silazanes, oximes, and the like; and
X₃ is independently a saturated or unsaturated hydrocarbon chain of 1-20 carbon atoms, or is hydrolyzable group selected from chloro, methoxy, propoxy, methylalkoxy, acetoxy, silazanes, oximes, and the like.

In some embodiments, A1 is methylene; linear, branched and/or substituted alkyl(e.g. $C_1$-$C_{20}$, $C_2$-$C_{20}$, $C_2$-$C_{10}$, $C_2$-$C_{10}$, $C_1$-$C$, $C_2$-$C_8$, $C_1$-$C_6$, $C_2$-$C_6$, $C_1$-$C_4$, $C_2$-$C_4$, or $C_1$-$C_3$ alkyl). In some embodiments, the alkyl is $C_1$-$C_{20}$ alkyl. In some embodiments, the alkyl is $C_2$-$C_2$ alkyl. In some embodiments, the alkyl is $C_2$-$C_{10}$ alkyl. In some embodiments, the alkyl is $C_1$-$C_8$ alkyl. In some embodiments, the alkyl is $C_2$-$C_9$ alkyl. In some embodiments, the alkyl is $C_1$-$C_6$alkyl. In some embodiments, the alkyl is $C_2$-$C_6$ alkyl. In some embodiments, the alkyl is $C_1$-$C_4$ alkyl. In some embodiments, the alkyl is $C_2$-$C_4$ alkyl. In some embodiments, the alkyl is $C_1$-$C_3$ alkyl.

In some embodiments, A1 is linear, branched and/or substituted aryl; linear, branched and/or substituted phenyl; linear, branched and/or substituted alkenyl (e.g. $C_1$-$C_{20}$, $C_2$-$C_{20}$, $C_2$-$C_{10}$, $C_2$-$C_{10}$, $C_1$-$C_8$, $C_2$-$C_8$, $C_1$-$C_6$, $C_2$-$C_6$, $C_1$-$C_4$, $C_2$-$C_4$, or $C_1$-$C_3$ alkenyl). In some embodiments, the alkenyl is $C_1$-$C_{20}$ alkenyl. In some embodiments, the alkenyl is $C_2$-$C_{20}$ alkenyl. In some embodiments, the alkenyl is $C_2$-$C_{10}$ alkenyl. In some embodiments, the alkenyl is $C_1$-$C_8$ alkenyl. In some embodiments, the alkenyl is $C_2$-$C_8$ alkenyl. In some embodiments, the alkenyl is $C_1$-$C_6$ alkenyl. In some embodiments, the alkenyl is $C_2$-$C_6$ alkenyl. In some embodiments, the alkenyl is $C_1$-$C_4$ alkenyl. In some embodiments, the alkenyl is $C_2$-$C_4$ alkenyl. In some embodiments, the alkenyl is $C_1$-$C_3$ alkenyl.

In some embodiments, A1 is —$CH_2$—(NH-alkyl-$NH_2$), where alkyl (e.g. $C_1$-$C_{20}$, $C_2$-$C_{20}$, $C_2$-$C_{10}$, $C_2$-$C_{10}$, $C_1$-$C_8$, $C_2$-$C_8$, $C_1$-$C_6$, $C_2$-$C_6$, $C_1$-$C_4$, $C_2$-$C_4$, or $C_1$-$C_3$ alkyl) can be linear, branched and/or substituted. In some embodiments, the alkyl is $C_2$-$C_2$ alkyl. In some embodiments, the alkyl is $C_2$-$C_{10}$ alkyl. In some embodiments, the alkyl is $C_1$-$C_8$ alkyl. In some embodiments, the alkyl is $C_2$-$C_8$ alkyl. In some embodiments, the alkyl is $C_1$-$C_6$ alkyl.

In some embodiments, the alkyl is $C_2$-$C_6$ alkyl. In some embodiments, the alkyl is $C_1$-$C_4$ alkyl. In some embodiments, the alkyl is $C_2$-$C_4$ alkyl. In some embodiments, the alkyl is $C_1$-$C_3$ alkyl.

In some embodiments, A1 is —$CH_2$—(NH-aryl-$NH_2$), where aryl can be linear, branched and/or substituted.

In some embodiments, A1 is —$CH_2$—(NH-phenyl-$NH_2$), where phenyl can be linear, branched and/or substituted;

In some embodiments, A1 is —$CH_2$—N—($CH_2CH$—$R_5$—$O$)$_2$—($CH_2CH$—$R_5$—$O$)$_{0-10}$—H, where $R_5$ can be H or $CH_3$; halogen; amino; azido; or nitro.

In some embodiments, a compound comprising one or more units of the formula is provided:

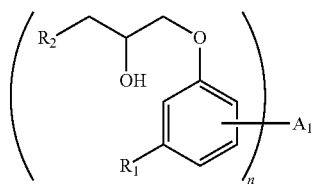

III wherein:
A$_1$ is methylene; linear, branched and/or substituted alkyl (e.g. $C_1$-$C_6$ alkyl); linear, branched and/or substituted aryl; linear, branched and/or substituted phenyl; linear, branched and/or substituted alkenyl (e.g. $C_1$-$C_6$ alkenyl); —$CH_2$—(NH-alkyl-$NH_2$), where alkyl (e.g. $C_1$-$C_6$ alkyl) can be linear, branched and/or substituted;

—$CH_2$—(NH-aryl-$NH_2$), where aryl can be linear, branched and/or substituted; —$CH_2$—(NH-phenyl-$NH_2$), where phenyl can be linear, branched and/or substituted; —$CH_2$—N—($CH_2CH$—$R_5$—$O$)$_2$—($CH_2CH$—$R_5$—$O$)$_{0-10}$—H, where $R_5$ can be H or $CH_3$; halogen; amino; azido; or nitro;

$R_1$ is

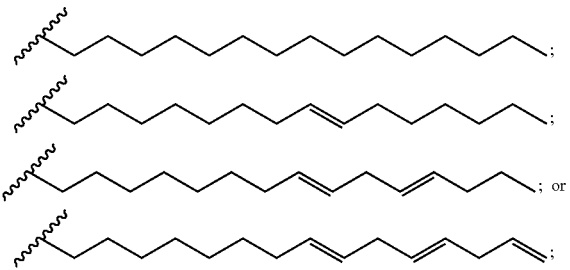

$R_2$ is 3-aminopropyltriethoxysilane; bis[(3-triethoxysilyl)propyl]amine; 3-aminopropyltrimethoxysilane; bis[(3-trimethoxysilyl)propyl]amine; 3-aminopropylmethyl-diethoxysilane; 3-aminopropylmethyl-dimethoxysilane; aminoethylamino-propyl-trimethoxysilane; N-bis(3-(trimethylsiloxy)propyl)-1,2-ethanediamine; amino-ethyl-aminopropyl-triethoxysilane; amino-ethyl-aminopropyl-methyl-dimethoxysilane; diethylene-triamino-propyl-trimethoxysilane; diethylene-triamino-propyl-methyl-dimethoxysilane; piperazinyl-propyl-methyldimethoxysilane; (N-phenylamino)-methyl-triethoxysilane; or 3-(N-phenylamino)-propyl-trimethoxysilane; and n is 1-20.

In some embodiments, A1 is methylene; linear, branched and/or substituted alkyl(e.g. $C_1$-$C_{20}$, $C_2$-$C_{20}$, $C_2$-$C_{10}$, $C_2$-$C_{10}$, $C_1$-$C_8$, $C_2$-$C_8$, $C_1$-$C_6$, $C_2$-$C_6$, $C_1$-$C_4$, $C_2$-$C_4$, or $C_1$-$C_3$ alkyl). In some embodiments, the alkyl is $C_1$-$C_{20}$ alkyl. In some embodiments, the alkyl is $C_2$-$C_2$ alkyl. In some embodiments, the alkyl is $C_2$-$C_{10}$ alkyl. In some embodiments, the alkyl is $C_1$-$C_8$ alkyl. In some embodiments, the alkyl is $C_2$-$C_8$ alkyl. In some embodiments, the alkyl is $C_1$-$C_6$alkyl. In some embodiments, the alkyl is $C_2$-$C_6$ alkyl. In some embodiments, the alkyl is $C_1$-$C_4$ alkyl. In some embodiments, the alkyl is $C_2$-$C_4$ alkyl. In some embodiments, the alkyl is $C_1$-$C_3$ alkyl.

In some embodiments, A1 is linear, branched and/or substituted aryl; linear, branched and/or substituted phenyl; linear, branched and/or substituted alkenyl (e.g. $C_1$-$C_{20}$, $C_2$-$C_{20}$, $C_2$-$C_{10}$, $C_2$-$C_{10}$, $C_1$-$C_8$, $C_2$-$C_8$, $C_1$-$C_6$, $C_2$-$C_6$, $C_1$-$C_4$, $C_2$-$C_4$, or $C_1$-$C_3$ alkenyl). In some embodiments, the alkenyl is $C_1$-$C_{20}$ alkenyl. In some embodiments, the alkenyl is $C_2$-$C_{20}$ alkenyl. In some embodiments, the alkenyl is $C_2$-$C_{10}$ alkenyl. In some embodiments, the alkenyl is $C_1$-$C_8$ alkenyl. In some embodiments, the alkenyl is $C_2$-$C_8$ alkenyl. In some embodiments, the alkenyl is $C_1$-$C_6$ alkenyl. In some embodiments, the alkenyl is $C_2$-$C_6$ alkenyl. In some embodiments, the alkenyl is $C_1$-$C_4$ alkenyl. In some embodiments, the alkenyl is $C_2$-$C_4$ alkenyl. In some embodiments, the alkenyl is $C_1$-$C_3$ alkenyl.

In some embodiments, A1 is —$CH_2$—(NH-alkyl-$NH_2$), where alkyl (e.g. $C_1$-$C_{20}$, $C_2$-$C_{20}$, $C_2$-$C_{10}$, $C_2$-$C_{10}$, $C_1$-$C_8$, $C_2$-$C_8$, $C_1$-$C_6$, $C_2$-$C_6$, $C_1$-$C_4$, $C_2$-$C_4$, or $C_1$-$C_3$ alkyl) can be linear, branched and/or substituted. In some embodiments, the alkyl is $C_2$-$C_2$ alkyl. In some embodiments, the alkyl is $C_2$-$C_{10}$ alkyl. In some embodiments, the alkyl is $C_1$-$C_8$ alkyl. In some embodiments, the alkyl is $C_2$-$C_8$ alkyl. In some embodiments, the alkyl is $C_1$-$C_6$ alkyl.

In some embodiments, the alkyl is $C_2$-$C_6$ alkyl. In some embodiments, the alkyl is $C_1$-$C_4$ alkyl. In some embodiments, the alkyl is $C_2$-$C_4$ alkyl. In some embodiments, the alkyl is $C_1$-$C_3$ alkyl.

In some embodiments, A1 is —$CH_2$—(NH-aryl-$NH_2$), where aryl can be linear, branched and/or substituted.

In some embodiments, A1 is —$CH_2$—(NH-phenyl-$NH_2$), where phenyl can be linear, branched and/or substituted;

In some embodiments, A1 is —$CH_2$—N—($CH_2CH$—$R_5$—O)$_2$—($CH_2CH$—$R_5$—O)$_{0.10}$—H, where $R_5$ can be H or $CH_3$; halogen; amino; azido; or nitro.

In some embodiments, a compound of the formula is provided:

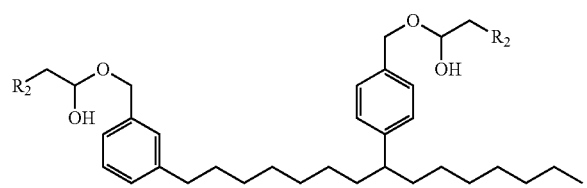

IV wherein
$R_2$ is independently selected from the group of 3-aminopropyltriethoxysilane; bis[(3-triethoxysilyl)propyl]amine; 3-aminopropyltrimethoxysilane; bis[(3-trimethoxysilyl)propyl]amine; 3-aminopropylmethyl-diethoxysilane; 3-aminopropylmethyl-dimethoxysilane; aminoethylamino-propyl-trimethoxysilane; N-bis(3-(trimethylsiloxy)propyl)-1,2-ethanediamine; amino-ethyl-aminopropyl-triethoxysilane; amino-ethyl-aminopropyl-methyl-dimethoxysilane; diethylene-triamino-propyl-trimethoxysilane; diethylene-triamino-propyl-methyl-dimethoxysilane; piperazinyl-propyl-methyldimethoxysilane; (N-phenylamino)-methyl-triethoxysilane; and 3-(N-phenylamino)-propyl-trimethoxysilane.

In some embodiments a compound having the formula of is provided:

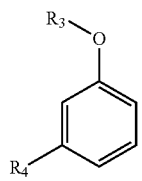

V wherein
$R_3$ is H or —$CH_2CH(OH)$—$CH_2$-[3-aminopropyltriethoxysilane; bis[(3-triethoxysilyl)propyl]amine; 3-aminopropyltrimethoxysilane; bis[(3-trimethoxysilyl)propyl]amine; 3-aminopropylmethyl-diethoxysilane; 3-aminopropylmethyl-dimethoxysilane; aminoethylamino-propyl-trimethoxysilane; N-bis(3-(trimethylsiloxy)propyl)-1,2-ethanediamine; amino-ethyl-aminopropyl-triethoxysilane; amino-ethyl-aminopropyl-methyl-dimethoxysilane; diethylene-triamino-propyl-trimethoxysilane; diethylene-triamino-propyl-methyl-dimethoxysilane; piperazinyl-propyl-methyldimethoxysilane; (N-phenylamino)-methyl-triethoxysilane; or3-(N-phenylamino)-propyl-trimethoxysilane]$R_4$ is

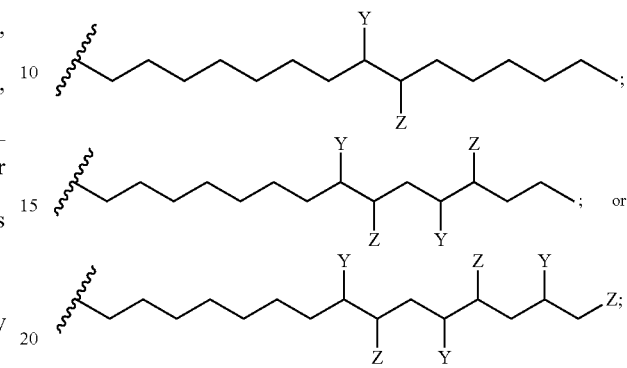

wherein Y is OH; 3-aminopropyltriethoxysilane; bis[(3-triethoxysilyl)propyl]amine; 3-aminopropyltrimethoxysilane; bis[(3-trimethoxysilyl)propyl]amine; 3-aminopropylmethyl-diethoxysilane; 3-aminopropylmethyl-dimethoxysilane; aminoethylamino-propyl-trimethoxysilane; N-bis(3-(trimethylsiloxy)propyl)-1,2-ethanediamine; amino-ethyl-aminopropyl-triethoxysilane; amino-ethyl-aminopropyl-methyl-dimethoxysilane; diethylene-triamino-propyl-trimethoxysilane; diethylene-triamino-propyl-methyl-dimethoxysilane; piperazinyl-propyl-methyldimethoxysilane; (N-phenylamino)-methyl-triethoxysilane; or 3-(N-phenylamino)-propyl-trimethoxysilane; and Z is OH; 3-aminopropyltriethoxysilane; bis[(3-triethoxysilyl)propyl]amine; 3-aminopropyltrimethoxysilane; bis[(3-trimethoxysilyl)propyl]amine; 3-aminopropylmethyl-diethoxysilane; 3-aminopropylmethyl-dimethoxysilane; aminoethylamino-propyl-trimethoxysilane; N-bis(3-(trimethylsiloxy)propyl)-1,2-ethanediamine; amino-ethyl-aminopropyl-triethoxysilane; amino-ethyl-aminopropyl-methyl-dimethoxysilane; diethylene-triamino-propyl-trimethoxysilane; diethylene-triamino-propyl-methyl-dimethoxysilane; piperazinyl-propyl-methyldimethoxysilane; (N-phenylamino)-methyl-triethoxysilane; or 3-(N-phenylamino)-propyl-trimethoxysilane.

The compounds can be produced according to any of the schemes provided for herein or that would otherwise produce the compounds. In some embodiments, the methods comprise reacting a cardanol or a cardanol derivative with a hydrolyzable silane under suitable conditions to produce the compound.

In some embodiments, the methods comprise reacting a cardanol or a cardanol derivative with a hydrolyzable silane in the presence of a free radical initiator at a temperature ranging from about 100° C. to 350° C., under an inert atmosphere and at a pressure from about 5 to 20 bars.

In some embodiments, the methods comprise reacting a cardanol or a cardanol derivative with a hydrolyzable silane at a temperature from about 0° C. to about 100° C., under an inert atmosphere, at an ambient pressure and without the use of any catalyst.

In some embodiments, the cardanol or cardanol derivative is cardanol, or mono and multifunctional cardanol-derived substrates, such as, but not limited to, those provided for herein.

In some embodiments, the cardanol or cardanol derivative has a purity from about 80% to about 99%. In some embodiments, the purity is about 90-99%, about 95- to about 99%, about 95, 96, 97, 98, or 99% pure. In some embodiments, the purity is about 100%.

In some embodiments, the monomeric cardanol-derived starting material is a cardanol epoxy, an alkylated cardanol, an alkoxylated cardanol, a cardanol allyl ether, an acrylated and methacrylated cardanol, an isomerized cardanol, or a cardanol based benzoxazines. In some embodiments, the cardanol derivative is a polymeric cardanol.

In some embodiments, the polymeric cardanol is a cardanol novolac, a cardanol resole, or a cardanol-epoxy novolac. In some embodiments, the cardanol derivative is an epoxidized phenolated cardanol derivative. In some embodiments, the cardanol is epoxy functionalized on the phenoxy OH, on the alkyl side chain, or on both positions.

In some embodiments, methods of producing a compound are provided, the method comprising reacting a cardanol substrate with an unsaturated hydrolyzable silane in the presence of the free radical initiator at a temperature ranging from about 100° C. to about 350° C. under an inert atmosphere that is substantially free from water. In some embodiments, the unsaturated silane is vinyltrimethoxysilane, vinyltriethoxysilane, vinyltriacetoxysilane, allyl(methoxy)dimethylsilane, allyltriisopropoxysilane, allylphenyldiphenoxysilane, and any combinations thereof.

In some embodiments, the free radical initiator is a peroxide catalyst in the group of benzoyl peroxide, di-t-butylperoxide, 2,5-dimethyl-2,5-di (t-butylperoxide) hexane, bis-(methylbenzoyl)peroxide, bis(dimethylbenzoyl) peroxide, dicumylperoxide, t-butyl 3-isopropenylcumyl peroxide, butyl 4,4-bis(tert-butylperoxy)valerate, bis(trimethylbenzoyl)peroxide, and any combinations thereof. These are non-limiting examples and other free radical initiator can be used.

In some embodiments, the silane is an amino-functional silane. In some embodiments, the amino-functional silanes is selected from the group consisting of 3-aminopropyltriethoxysilane; bis[(3-triethoxysilyl)propyl]amine; 3-aminopropyltrimethoxysilane; bis[(3-trimethoxysilyl)propyl]amine; 3-aminopropylmethyl-diethoxysilane; 3-aminopropylmethyl-dimethoxysilane; aminoethylaminopropyl-trimethoxysilane; N-bis(3-(trimethylsiloxy)propyl)-1,2-ethanediamine; amino-ethyl-aminopropyl-triethoxysilane; amino-ethyl-aminopropyl-methyl-dimethoxysilane; diethylene-triamino-propyl-trimethoxysilane; diethylene-triamino-propyl-methyl-dimethoxysilane; piperazinyl-propyl-methyldimethoxysilane; (N-phenylamino)-methyl-triethoxysilane; and 3-(N-phenylamino)-propyl-trimethoxysilane.

In some embodiments, the silane comprise a hydrolyzable group selected from the group consisting of chloro, methoxy, propoxy, methylalkoxy, acetoxy, silazane, and oxime.

Embodiments provided herein also provide compositions comprising a compound as provided herein or a compound produced according to embodiments provided herein. In some embodiments, the composition is an adhesion promoter in an epoxy and polyurethane formulations, a fiber sizing agent, a rubbers, a thermoplastic material, a self-curable polymer for hydrophobic coatings, or any combination thereof.

The compounds and methods of making the same provided for in the present application can be used in many methods/applications. Examples include, but not limited to, the use as a coupling agents for polymer applications like thermosets, urethanes, epoxies, phenolics, thermoplastics, polyolefin, where the modification with silanes provides improved adhesion and also more sites for reactivity. Additional application opportunities include construction and packaging of electronic boards, paper packaging, food packaging where the moisture resistance ability of siloxane cured network will be applicable. Further opportunities include the use for surface modifications to provide more wettability to the surface and on the other end to provide super hydrophobic surfaces, self-cleaning surfaces with proper selection of silanes. In some embodiments, a composition comprising any compound described herein is provided. In some embodiments, the composition is an adhesion promoter in an epoxy and polyurethane formulations, a fiber sizing agent, a rubber, a thermoplastic material, a self-curable polymer for hydrophobic coatings, or any combination thereof.

Other aspects and advantages of these silylated cardanol-derived products will be apparent to those skilled in the art. Experimental details are provided in the following examples, which are provided by way of illustration only and should not be construed to limit the disclosure or the appended claims.

EXAMPLES

Example 1: Silylation of Cardanol

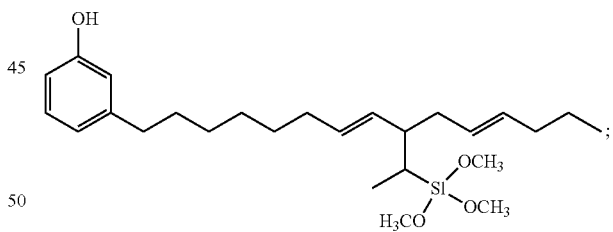

420 gms. of cardanol (1.4 moles) was mixed with 207 gms. of vinyltrimethoxysilane (1.4 moles) together in a high-pressure stainless-steel PARR reactor (PARR Instrument Company, IL, USA). Luperox-101 (6 gms., 1% w/w), used as a catalyst for this reaction, was then added to the reaction mixture. The reaction mixture was then purged with nitrogen for several minutes, to create inert environment. The reactor was heated to 250° C. and kept it isothermally at this temperature for 5 hours. The reactor was cooled down at the end of 5 hours. The final weight of the product was measured, where a total yield of 98.5% was calculated. The product was secured in an air-tight and moisture-free container.

Example 2: Silylation of Cardanol Based Glycidyl Ether

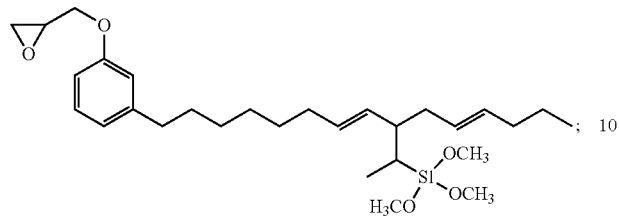

The high-pressure reactor vessel (1 L) was charged with 427 gms. of cardanol glycidyl ether (1.2 moles) and 178 gms. of vinyltrimethoxysilane (1.2 moles), mixed together with Luperox-101 (6 gms., 1% w/w) used as a catalyst. The reactor was purged with nitrogen for several minutes. The silylation reaction was carried out at 250° C. for 5 hours. The reactor was cooled down at the end of 5 hours. At the end of the reaction, the product was secured in an air-tight, moisture free container. The yield was found to be around 96.3%.

Example 3: Adduct of Silylated Cardanol Based Glycidyl Ether And Amine

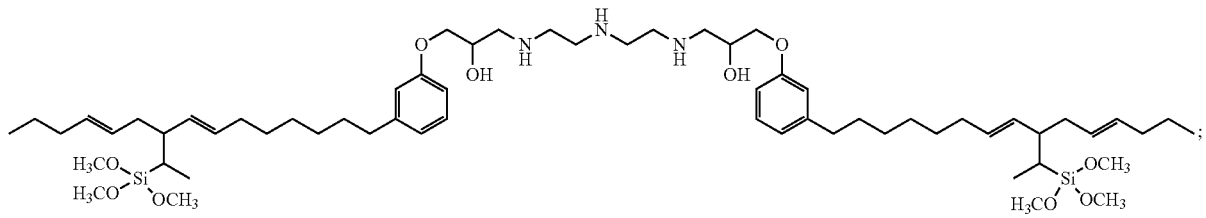 [SMILES: CCC/C=C/CC(/C=C/CCCCCCc1cccc(OCC(O)CNCCNCCNCC(O)COc2cccc(CCCCCC/C=C/C(C/C=C/CCC)C(C)[Si](OC)(OC)OC)c2)c1)C(C)[Si](OC)(OC)OC]

51.5 gms (0.5 moles) of diethylenetriamine was added to a round bottom flask. It was kept under constant stirring with a nitrogen blanket over it for about 15 minutes. Then, 562 gms. (2 epoxy equivalent, EEW=562 g/mol.) of cardanol based glycidyl ether was added to the flask and the mixture was kept under constant stirring for 6 hours at 60° C. and with a nitrogen blanket above it. At the end of 6 hours, the reaction mixture was cooled to 35° C.–40° C. and was secured in an air-tight and moisture free container.

Various references and patents are disclosed herein, each of which are hereby incorporated by reference for the purpose that they are cited.

From the foregoing, it will be appreciated that various embodiments of the present disclosure have been described herein for purposes of illustration, and that various modifications can be made without departing from the scope and spirit of the present disclosure. Accordingly, the various embodiments disclosed herein are not intended to be limiting.

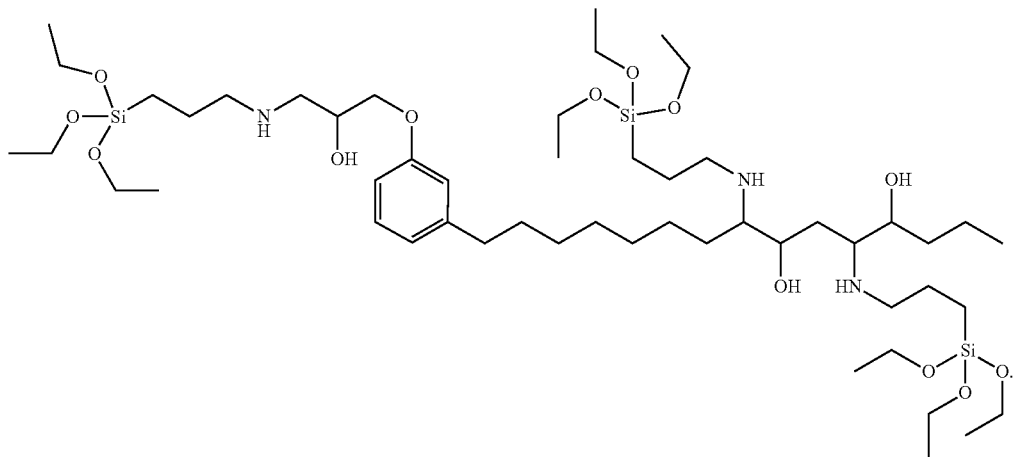

26. The compound of claim 1, wherein the compound comprises one or more units of the formula:
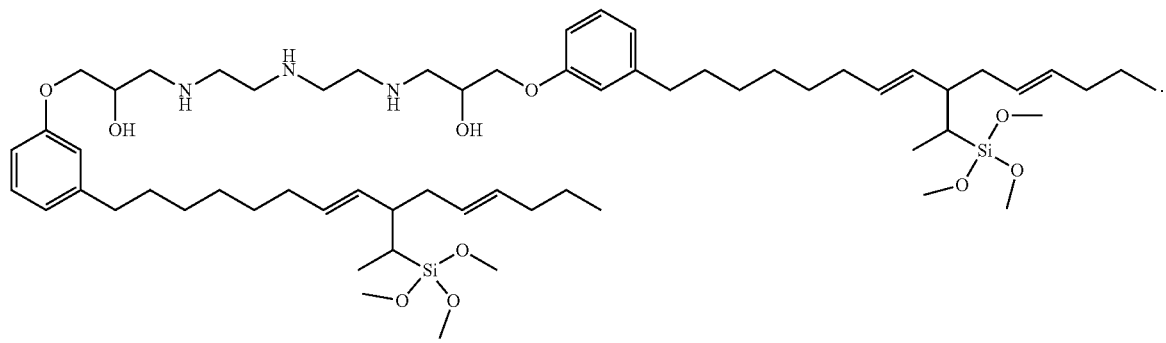

What is claimed is:

1. A compound comprising one or more units of the formula

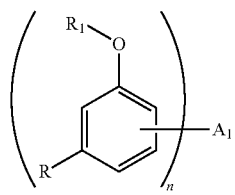

wherein $A_1$ is methylene; linear, branched and/or substituted alkyl; linear, branched and/or substituted aryl; linear, branched and/or substituted phenyl; linear, branched and/or substituted alkenyl; —$CH_2$—(NH-alkyl-$NH_2$), where alkyl can be linear, branched and/or substituted; —$CH_2$—(NH-aryl-$NH_2$), where aryl can be linear, branched and/or substituted; —$CH_2$—(NH-phenyl-$NH_2$), where phenyl can be linear, branched and/or substituted; —$CH_2$—NH—($CH_2CH(R_5)O)_2$—($CH_2CH(R_5)O)_{0-10}$—H, where $R_5$ can be H or $CH_3$; halogen; amino; azido; or nitro;

$R_1$ is hydrogen, an epoxy, an alkyl, an ether or an ester group;

n is 1-20; and

R is

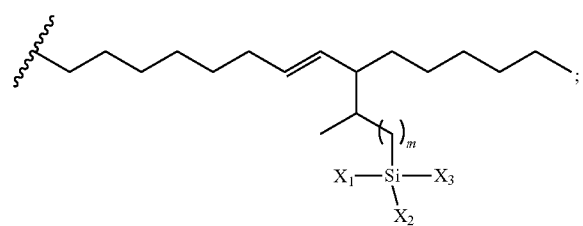

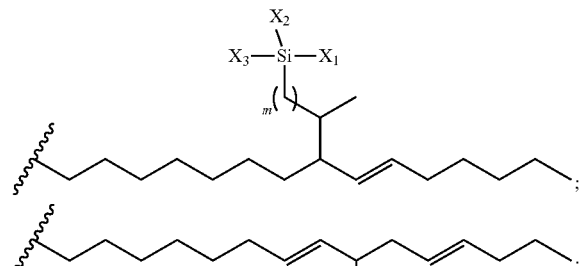

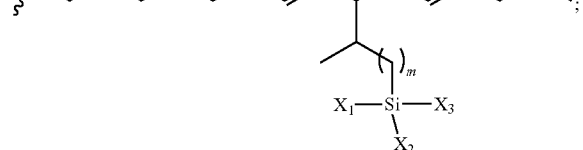

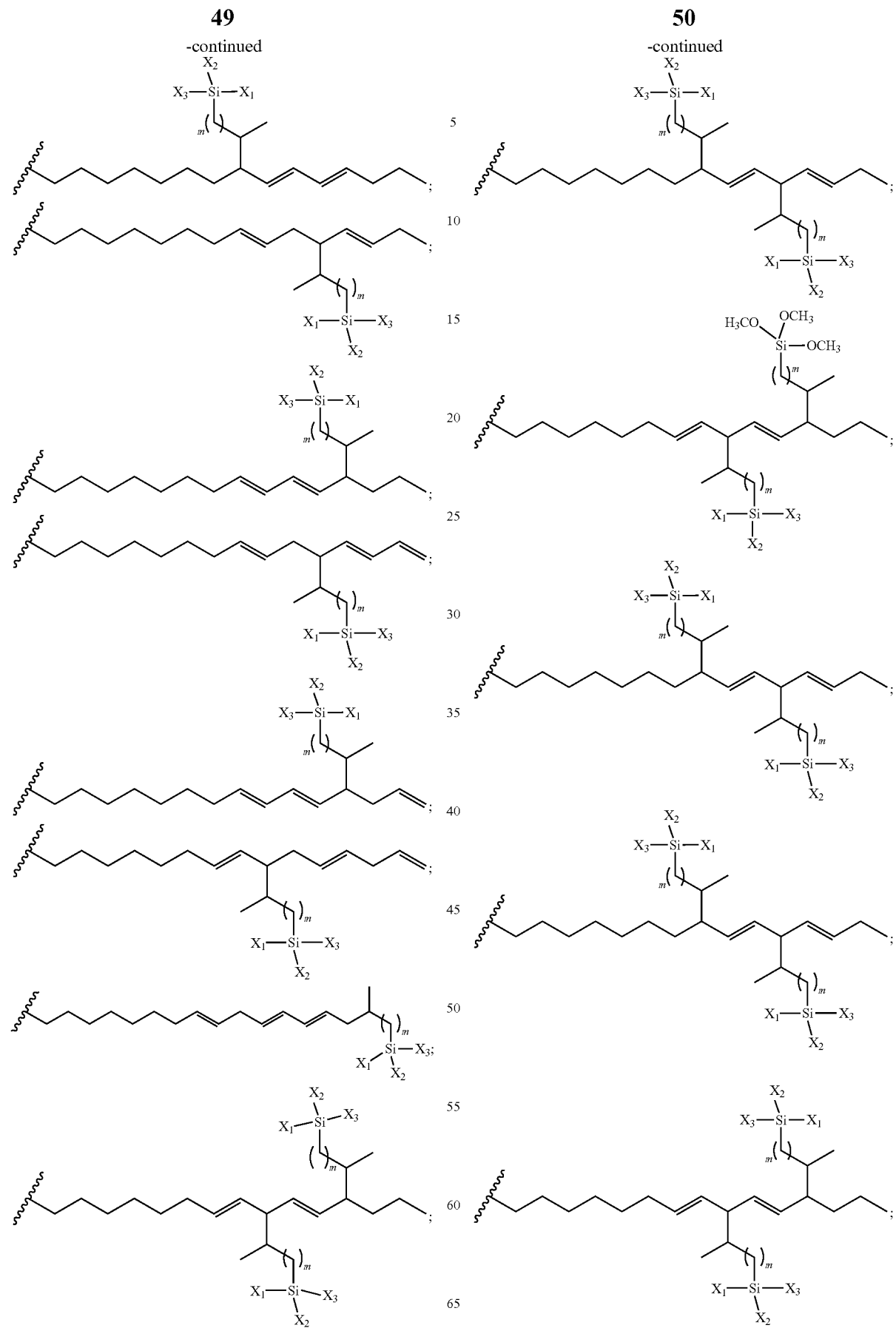

-continued
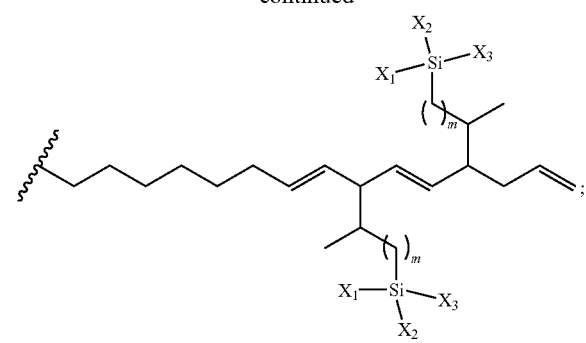
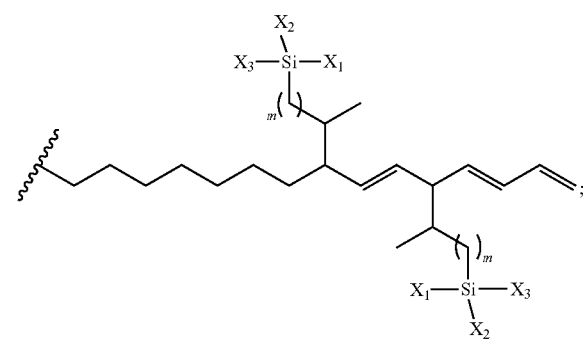
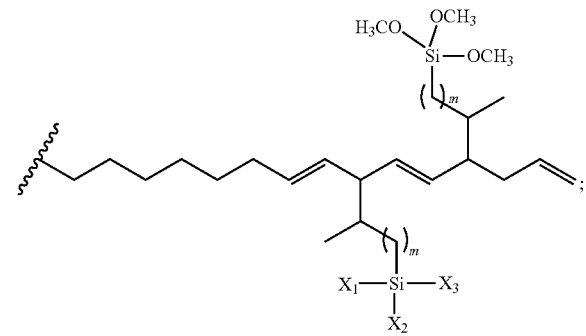
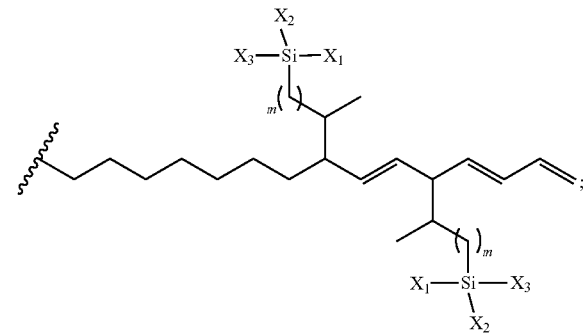
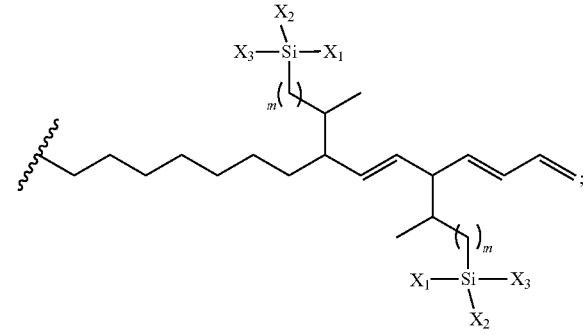
-continued
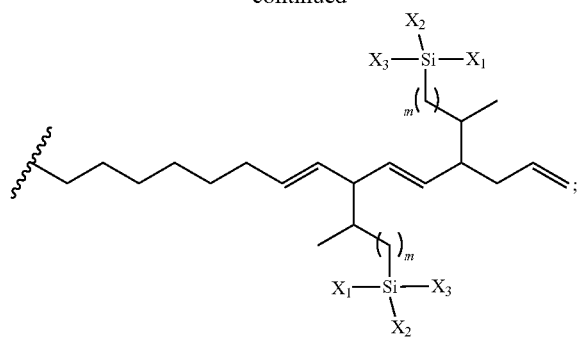
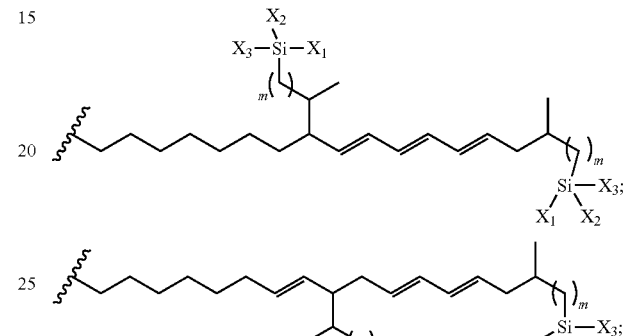
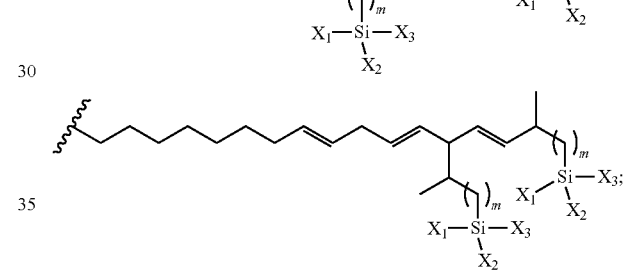
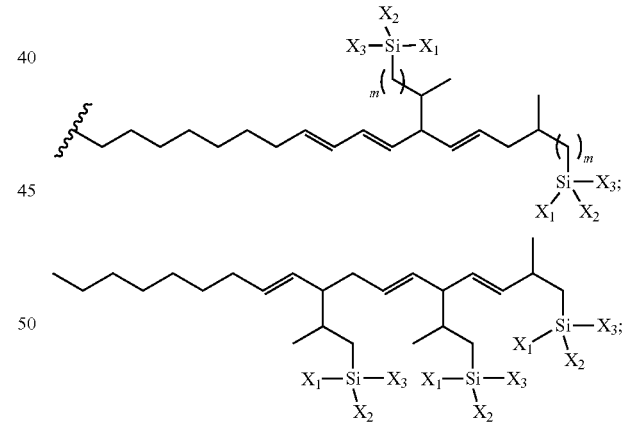
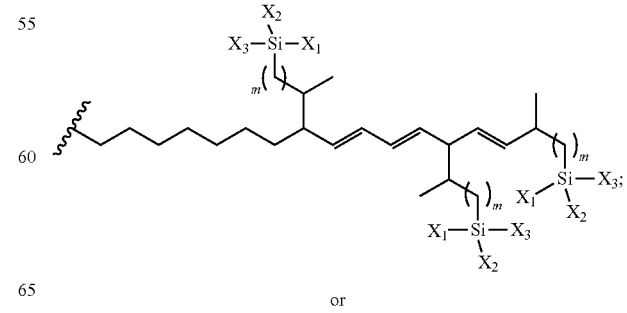
or -continued

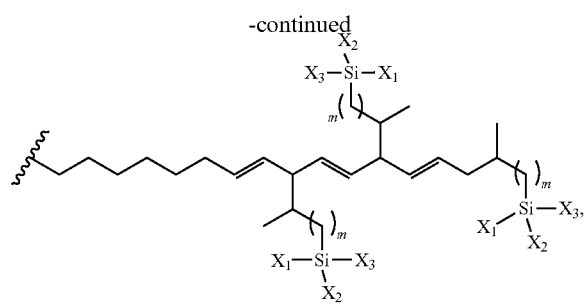

wherein
m is independently 0-20;
X$_1$ is independently a hydrolyzable group selected from the group consisting of chloro, methoxy, propoxy, methylalkoxy, acetoxy, silazanes, and oximes;
X$_2$ is independently a saturated or unsaturated hydrocarbon chain of 1-20 carbon atoms, or is hydrolyzable group selected from the group consisting of chloro, methoxy, propoxy, methylalkoxy, acetoxy, silazanes, and oximes; and
X$_3$ is independently a saturated or unsaturated hydrocarbon chain of 1-20 carbon atoms, or is hydrolyzable group selected from the group consisting of chloro, methoxy, propoxy, methylalkoxy, acetoxy, silazanes, and oximes.

2. A method producing a compound according to claim 1, comprising reacting a cardanol or a cardanol derivative with a hydrolyzable silane under suitable conditions to produce the compound.

3. The method of claim 2, wherein the cardanol or cardanol derivative is cardanol, or mono or multifunctional cardanol-derived substrates.

4. The method of claim 2, wherein the number of repeating units in cardanol-derived substrate is 1 to about 20.

5. The method of claim 2, wherein the cardanol has a purity from about 80% to about 99%.

6. The method of claim 2, wherein the monomeric cardanol-derived starting material is a cardanol epoxy, an alkylated cardanol, an alkoxylated cardanol, a cardanol allyl ether, an acrylated and methacrylated cardanol, an isomerized cardanol, or a cardanol based benzoxazine.

7. The method of claim 2, wherein the cardanol derivative is a polymeric cardanol.

8. The method of claim 2, wherein the polymeric cardanol is a cardanol novolac, a cardanol resole, or a cardanol-epoxy novolac.

9. The method of claim 7, wherein the cardanol derivative is an epoxidized phenolated cardanol derivative.

10. The method of claim 2, wherein the cardanol is epoxy functionalized on the phenoxy OH, on the alkyl side chain, or on both positions.

11. A method of producing a compound according to claim 1, comprising reacting a cardanol or a cardanol derivative with a hydrolyzable silane in the presence of a free radical initiator at a temperature ranging from about 100° C. to 350° C., under an inert atmosphere and at a pressure from about 5 to 20 bars.

12. A method of producing a compound according to claim 1, the method comprising reacting a cardanol or a cardanol derivative with a hydrolyzable silane at a temperature from about 0° C. to about 100° C., under an inert atmosphere, at an ambient pressure and without the use of any catalyst.

13. A method of producing a compound of claim 1, the method comprising reacting a cardanol substrate with an unsaturated hydrolyzable silane in the presence of the free radical initiator at a temperature ranging from about 100° C. to about 35° C. under an inert atmosphere that is substantially free from water.

14. The method of claim 13, wherein the unsaturated hydrolyzable silane is vinyltrimethoxysilane, vinyltriethoxysilane, vinyltriacetoxysilane, allyl(methoxy)dimethylsilane, allyltriisopropoxysilane, allylphenyldiphenoxysilane, or any combinations thereof.

15. The method of claim 13, wherein the free radical initiator is a peroxide catalyst is selected from the group consisting of benzoyl peroxide, di-t-butylperoxide, 2,5-dimethyl-2,5-di (t-butylperoxide) hexane, bis-(methylbenzoyl)peroxide, bis(dimethylbenzoyl) peroxide, dicumylperoxide, t-butyl 3-isopropenylcumyl peroxide, butyl 4,4-bis (tert-butylperoxy)valerate, bis(trimethylbenzoyl)peroxide, and any combinations thereof.

16. The method of claim 13, wherein the unsaturated hydrolyzable silane is an amino-functional silane.

17. The method of claim 16, wherein the amino-functional silane is selected from the group consisting of 3-aminopropyltriethoxysilane; bis[(3-triethoxysilyl)propyl]amine; 3-aminopropyltrimethoxysilane; bis[(3-trimethoxysilyl)propyl]amine; 3-aminopropylmethyl-diethoxysilane; 3-aminopropylmethyl-dimethoxysilane; aminoethylamino-propyl-trimethoxysilane; N-bis(3-(trimethylsiloxy)propyl)-1,2-ethanediamine; amino-ethyl-aminopropyl-triethoxysilane; amino-ethyl-aminopropyl-methyl-dimethoxysilane; diethylene-triamino-propyl-trimethoxysilane; diethylene-triamino-propyl-methyl-dimethoxysilane; piperazinyl-propyl-methyldimethoxysilane; (N-phenylamino)-methyl-triethoxysilane; and 3-(N-phenylamino)-propyl-trimethoxysilane.

18. The method of claim 13, wherein the unsaturated hydrolyzable silane comprises a hydrolyzable group selected from the group consisting of chloro, methoxy, propoxy, methylalkoxy, acetoxy, silazane, and oxime.

19. The compound of claim 1, wherein the compound comprises one or more units of the formula:

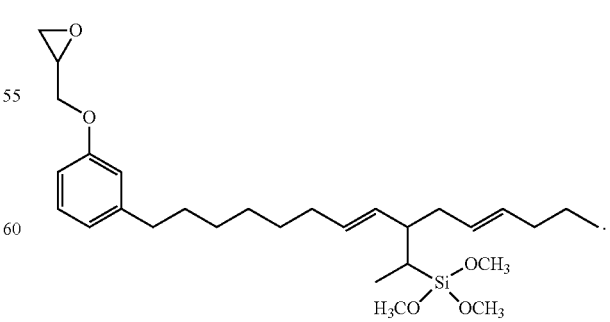

20. The compound of claim 1, wherein the compound comprises one or more units of the formula:

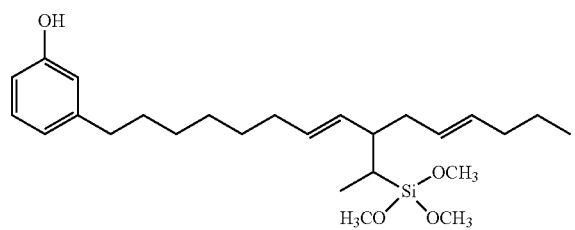

21. A compound comprising one or more units of the formula

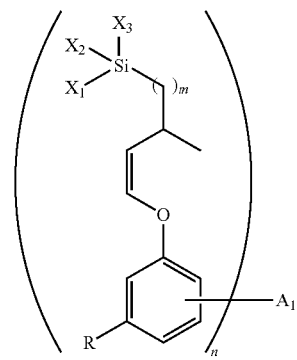

II wherein:
  $A_1$ is methylene; linear, branched and/or substituted alkyl; linear, branched and/or substituted aryl; linear, branched and/or substituted phenyl; linear, branched and/or substituted alkenyl; —$CH_2$—(NH-alkyl-$NH_2$), where alkyl can be linear, branched and/or substituted; —$CH_2$—(NH-aryl-$NH_2$), where aryl can be linear, branched and/or substituted; —$CH_2$—(NH-phenyl-$NH_2$), where phenyl can be linear, branched and/or substituted; —$CH_2$—NH—($CH_2CH(R_5)O)_2$—($CH_2CH(R_5)O)_{0-10}$—H, where $R_5$ can be H or $CH_3$; halogen; amino; azido; or nitro;
  n is 1-20; and
  R is

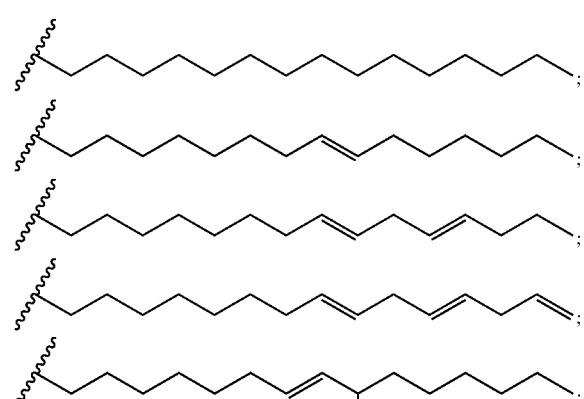

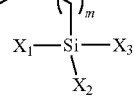

-continued

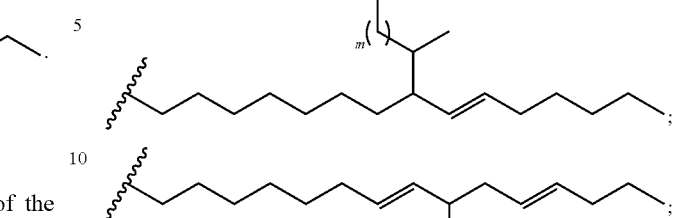

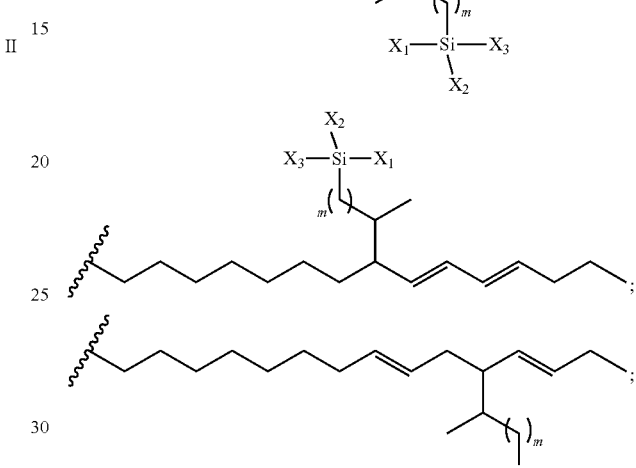

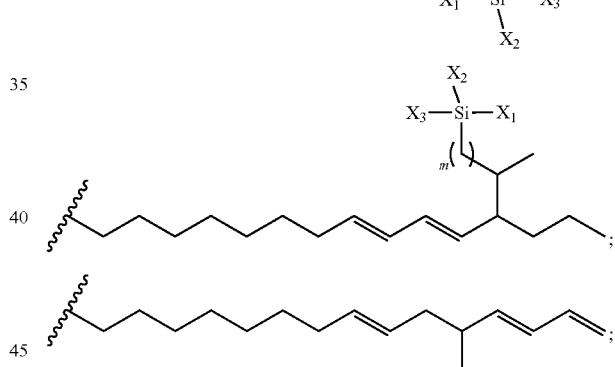

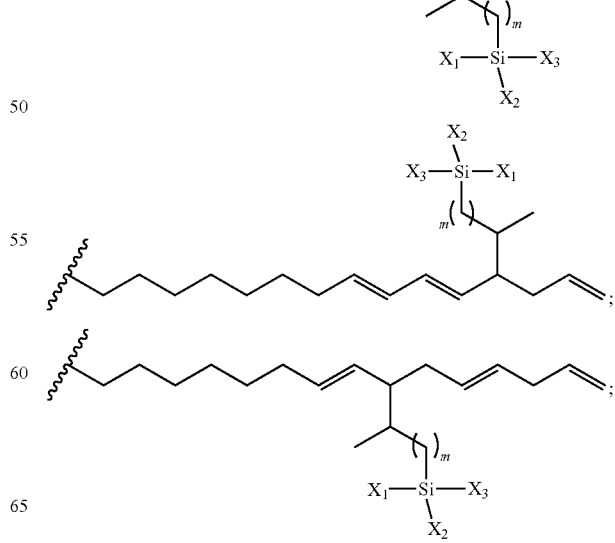

57
-continued
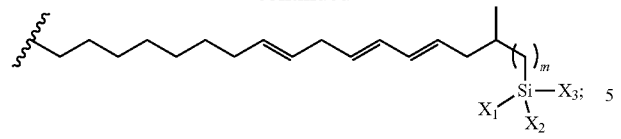
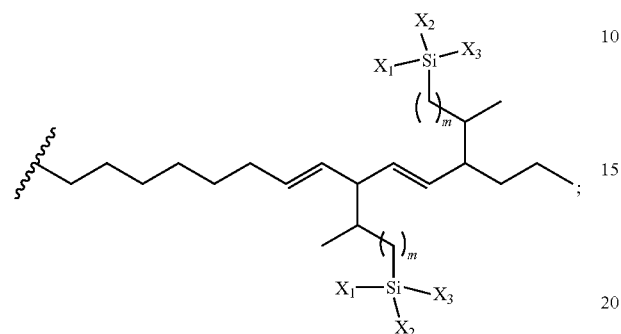
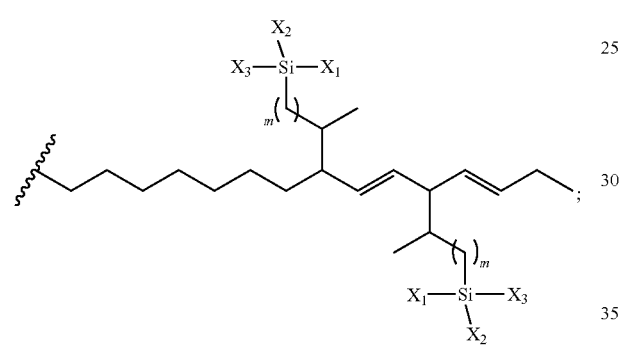
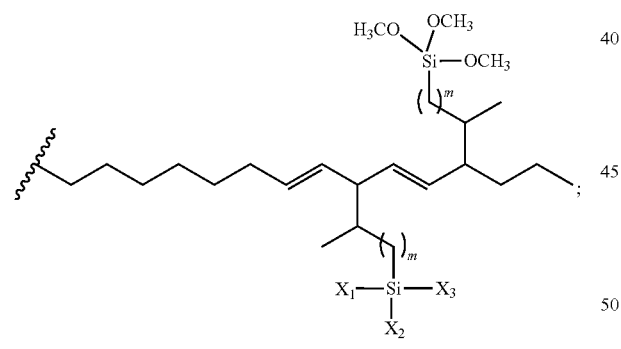
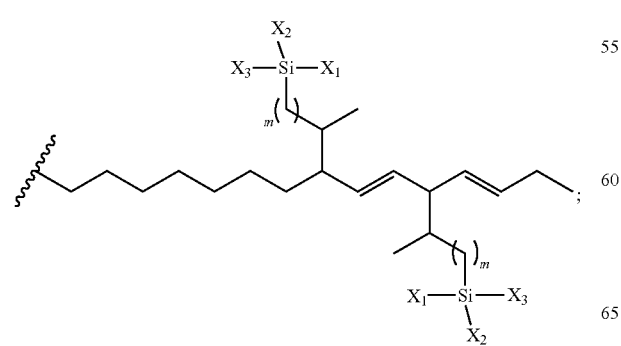
58
-continued
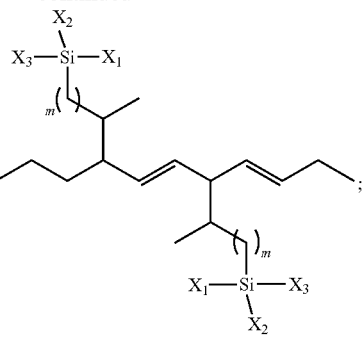
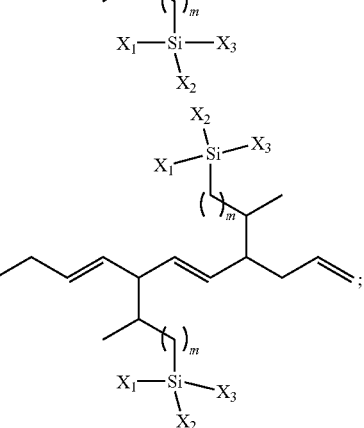

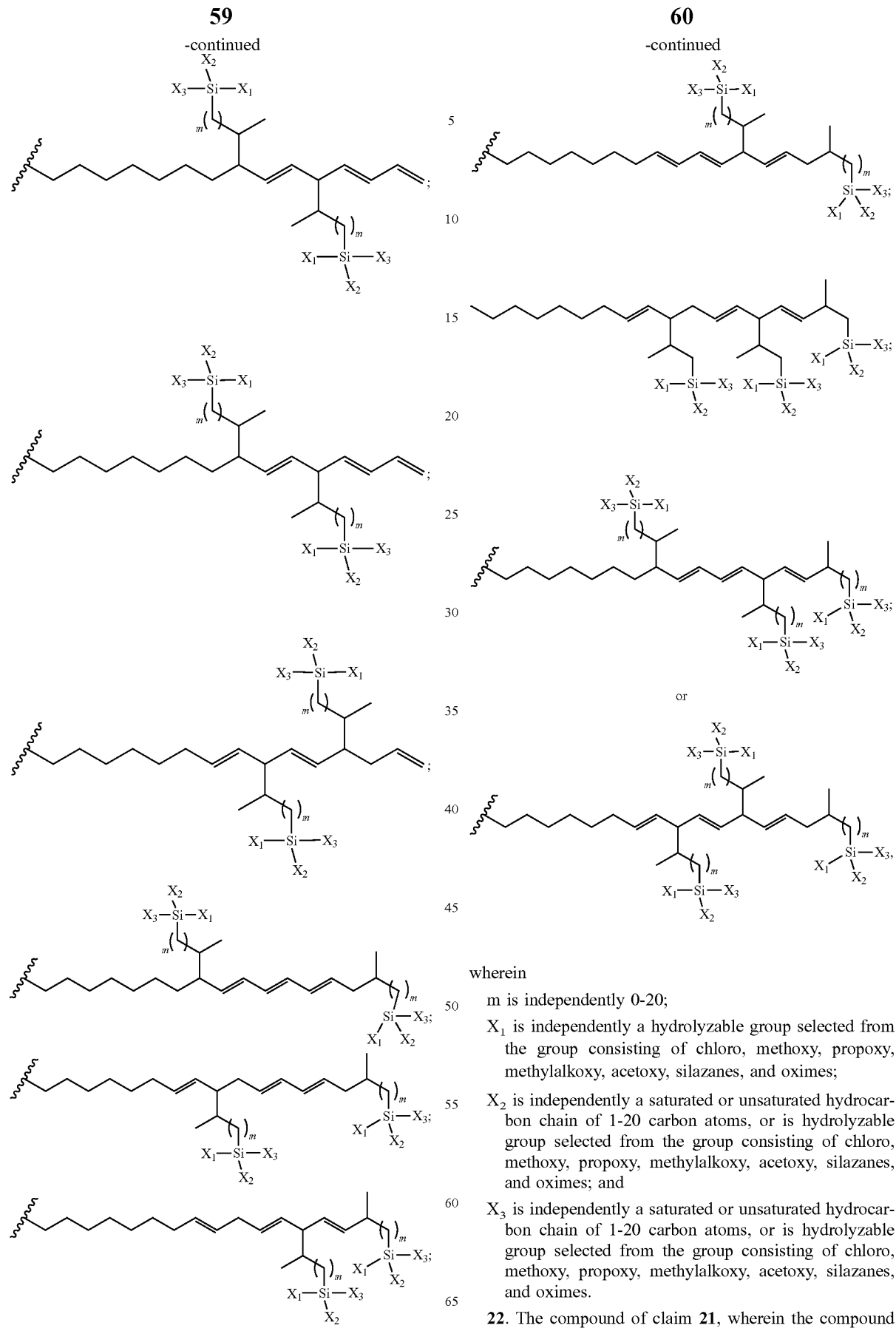

wherein m is independently 0-20;

$X_1$ is independently a hydrolyzable group selected from the group consisting of chloro, methoxy, propoxy, methylalkoxy, acetoxy, silazanes, and oximes;

$X_2$ is independently a saturated or unsaturated hydrocarbon chain of 1-20 carbon atoms, or is hydrolyzable group selected from the group consisting of chloro, methoxy, propoxy, methylalkoxy, acetoxy, silazanes, and oximes; and $X_3$ is independently a saturated or unsaturated hydrocarbon chain of 1-20 carbon atoms, or is hydrolyzable group selected from the group consisting of chloro, methoxy, propoxy, methylalkoxy, acetoxy, silazanes, and oximes.

22. The compound of claim 21, wherein the compound comprises one or more units of the formula:

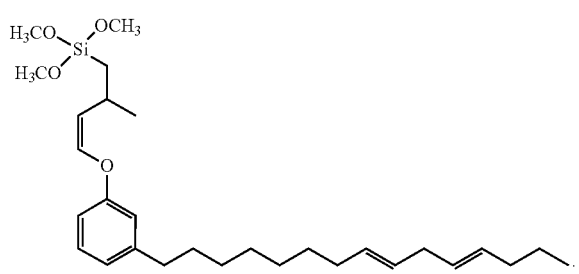

23. A compound comprising one or more units of the formula

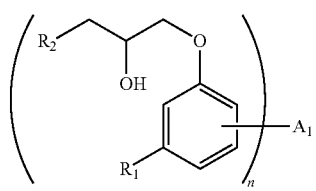

wherein:
A$_1$ is methylene; linear, branched and/or substituted alkyl (e.g. C$_1$-C$_6$ alkyl); linear, branched and/or substituted aryl; linear, branched and/or substituted phenyl; linear, branched and/or substituted alkenyl (e.g. C$_1$-C$_6$ alkenyl); —CH$_2$—(NH-alkyl-NH$_2$), where alkyl (e.g. C$_1$-C$_6$ alkyl) can be linear, branched and/or substituted; —CH$_2$—(NH-aryl-NH$_2$), where aryl can be linear, branched and/or substituted; —CH$_2$—(NH-phenyl-NH$_2$), where phenyl can be linear, branched and/or substituted; —CH$_2$—NH—(CH$_2$CH(R$_5$)O)$_2$—(CH$_2$CH(R$_5$)O)$_{0-10}$—H, where R$_5$ can be H or CH$_3$; halogen; amino; azido; or nitro;

R$_1$ is

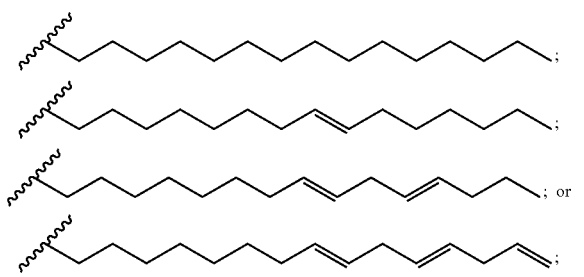

R$_2$ is 3-aminopropyltriethoxysilane; bis[(3-triethoxysilyl)propyl]amine; 3-aminopropyltrimethoxysilane; bis[(3-trimethoxysilyl)propyl]amine; 3-aminopropylmethyl-diethoxysilane; 3-aminopropylmethyl-dimethoxysilane; aminoethylamino-propyl-trimethoxysilane; N-bis(3-(trimethylsiloxy)propyl)-1,2-ethanediamine; amino-ethyl-aminopropyl-triethoxysilane; amino-ethyl-aminopropyl-methyl-dimethoxysilane; diethylene-triamino-propyl-trimethoxysilane; diethylene-triamino-propyl-methyl-dimethoxysilane; piperazinyl-propyl-methyldimethoxysilane; (N-phenylamino)-methyl-triethoxysilane; or 3-(N-phenylamino)-propyl-trimethoxysilane; and n is 1-20; or the formula:

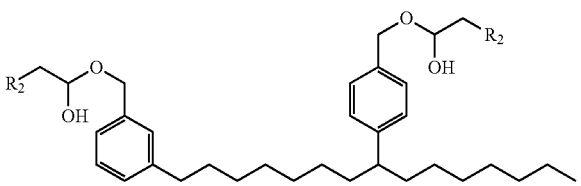

wherein
R$_2$ is independently selected from the group consisting of 3-aminopropyltriethoxysilane; bis[(3-triethoxysilyl)propyl]amine; 3-aminopropyltrimethoxysilane; bis[(3-trimethoxysilyl)propyl]amine; 3-aminopropylmethyl-diethoxysilane; 3-aminopropylmethyl-dimethoxysilane; aminoethylamino-propyl-trimethoxysilane; N-bis(3-(trimethylsiloxy)propyl)-1,2-ethanediamine; amino-ethyl-aminopropyl-triethoxysilane; amino-ethyl-aminopropyl-methyl-dimethoxysilane; diethylene-triamino-propyl-trimethoxysilane; diethylene-triamino-propyl-methyl-dimethoxysilane; piperazinyl-propyl-methyldimethoxysilane; (N-phenylamino)-methyl-triethoxysilane; and 3-(N-phenylamino)-propyl-trimethoxysilane; or the formula of:

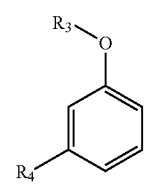

wherein:
R$_3$ is H or —CH$_2$CH(OH)—CH$_2$-[3-aminopropyltriethoxysilane; bis[(3-triethoxysilyl)propyl]amine; 3-aminopropyltrimethoxysilane; bis[(3-trimethoxysilyl)propyl]amine; 3-aminopropylmethyl-diethoxysilane; 3-aminopropylmethyl-dimethoxysilane; aminoethylamino-propyl-trimethoxysilane; N-bis(3-(trimethylsiloxy)propyl)-1,2-ethanediamine; amino-ethyl-aminopropyl-triethoxysilane; amino-ethyl-aminopropyl-methyl-dimethoxysilane; diethylene-triamino-propyl-trimethoxysilane; diethylene-triamino-propyl-methyl-dimethoxysilane; piperazinyl-propyl-methyldimethoxysilane; (N-phenylamino)-methyl-triethoxysilane; or 3-(N-phenylamino)-propyl-trimethoxysilane;

R$_4$ is

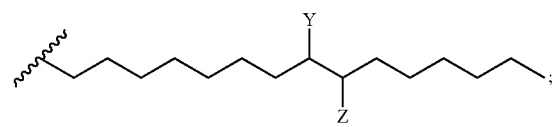

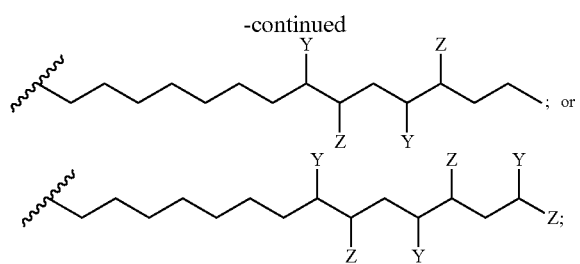

wherein Y is OH; 3-aminopropyltriethoxysilane; bis[(3-triethoxysilyl)propyl]amine; 3-aminopropyltrimethoxysilane; bis[(3-trimethoxysilyl)propyl]amine; 3-aminopropylmethyl-diethoxysilane; 3-aminopropylmethyl-dimethoxysilane; aminoethylamino-propyl-trimethoxysilane; N-bis(3-(trimethylsiloxy)propyl)-1,2-ethanediamine; amino-ethyl-aminopropyl-triethoxysilane; amino-ethyl-aminopropyl-methyl-dimethoxysilane; diethylene-triamino-propyl-trimethoxysilane; diethylene-triamino-propyl-methyl-dimethoxysilane; piperazinyl-propyl-methyldimethoxysilane; (N-phenylamino)-methyl-triethoxysilane; or 3-(N-phenylamino)-propyl-trimethoxysilane; and Z is OH; 3-aminopropyltriethoxysilane; bis[(3-triethoxysilyl)propyl]amine; 3-aminopropyltrimethoxysilane; bis[(3-trimethoxysilyl)propyl]amine; 3-aminopropylmethyl-diethoxysilane; 3-aminopropylmethyl-dimethoxysilane; aminoethylamino-propyl-trimethoxysilane; N-bis(3-(trimethylsiloxy)propyl)-1,2-ethanediamine; amino-ethyl-aminopropyl-triethoxysilane; amino-ethyl-aminopropyl-methyl-dimethoxysilane; diethylene-triamino-propyl-trimethoxysilane; diethylene-triamino-propyl-methyl-dimethoxysilane; piperazinyl-propyl-methyldimethoxysilane; (N-phenylamino)-methyl-triethoxysilane; or 3-(N-phenylamino)-propyl-trimethoxysilane.

24. The compound of claim 23, wherein the compound comprises one or more units of the formula:

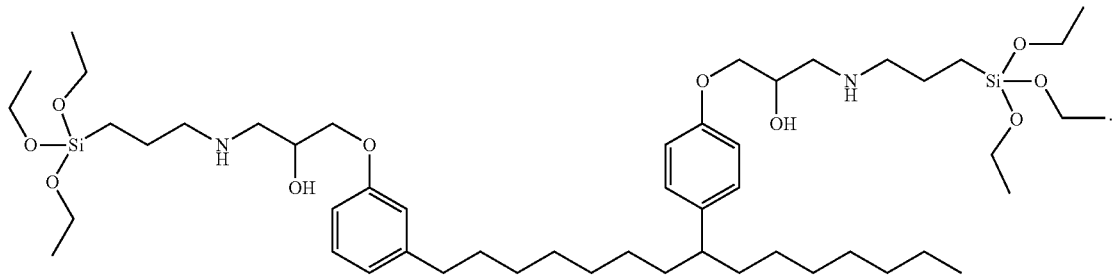

25. The compound of claim 23, wherein the compound comprises one or more units of the formula: